US012563140B2

(12) United States Patent
Mao et al.

(10) Patent No.: US 12,563,140 B2
(45) Date of Patent: Feb. 24, 2026

(54) INCOMING CALL VOLUME CONTROL METHOD AND ELECTRONIC DEVICE

(71) Applicant: HONOR DEVICE CO., LTD., Shenzhen (CN)

(72) Inventors: Lu Mao, Shenzhen (CN); Renpeng Li, Shenzhen (CN); Xingyu Liu, Shenzhen (CN); Long Huang, Shenzhen (CN); Yang Gao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 322 days.

(21) Appl. No.: 18/282,344

(22) PCT Filed: May 16, 2022

(86) PCT No.: PCT/CN2022/093156
§ 371 (c)(1),
(2) Date: Sep. 15, 2023

(87) PCT Pub. No.: WO2023/016016
PCT Pub. Date: Feb. 16, 2023

(65) Prior Publication Data
US 2024/0163364 A1     May 16, 2024

(30) Foreign Application Priority Data
Aug. 12, 2021    (CN) .......................... 202110924918.5

(51) Int. Cl.
*H04M 1/72463* (2021.01)
*H04M 1/72454* (2021.01)
(Continued)

(52) U.S. Cl.
CPC . *H04M 1/724634* (2022.02); *H04M 1/72454* (2021.01); *H04M 1/72484* (2021.01);
(Continued)

(58) Field of Classification Search
CPC ..... H04M 1/724634; H04M 1/724631; H04M 1/72463; H04M 1/72484; H04M 1/72454;
(Continued)

(56) References Cited

U.S. PATENT DOCUMENTS 9,497,332 B2    11/2016   Zhang et al.
2010/0081481 A1    4/2010   Hirokawa
(Continued)

FOREIGN PATENT DOCUMENTS

CN        104301496 A      1/2015
CN        104935717 A      9/2015
(Continued)

*Primary Examiner* — Keith Ferguson
(74) *Attorney, Agent, or Firm* — WOMBLE BOND DICKINSON (US) LLP

(57)                ABSTRACT

This application provides an incoming call volume control method and an electronic device. The method includes: An electronic device determines to start a detection based on a state of a display screen, a state of an optical proximity sensor, and an incoming call situation. During the detection, if target biological feature information is detected by the electronic device, the electronic device may adjust an incoming call volume. Therefore, a convenient and fast incoming call volume adjustment mode is provided, which enables a user to adjust the incoming call volume without operating the electronic device. Moreover, the electronic device starts the detection when a specific condition is satisfied, thereby effectively reducing power consumption while ensuring time relevancy and high efficiency of the detection.

19 Claims, 22 Drawing Sheets

(51) Int. Cl.

| | |
|---|---|
| *H04M 1/72484* | (2021.01) |
| *G06V 40/12* | (2022.01) |
| *G06V 40/13* | (2022.01) |
| *G06V 40/18* | (2022.01) |

(52) U.S. Cl.
CPC ...... *G06V 40/1318* (2022.01); *G06V 40/1347* (2022.01); *G06V 40/193* (2022.01); *H04M 2250/22* (2013.01)

(58) Field of Classification Search
CPC .......... H04M 2250/22; H04M 2250/52; G06V 40/193; G06V 40/1347
See application file for complete search history.

(56) References Cited

U.S. PATENT DOCUMENTS

| | | |
|---|---|---|
| 2016/0044151 A1 | 2/2016 | Shoemaker et al. |
| 2016/0173702 A1* | 6/2016 | Zhang .................. G06F 3/0304 |
| | | 455/567 |

FOREIGN PATENT DOCUMENTS

| | | |
|---|---|---|
| CN | 105744052 A | 7/2016 |
| CN | 106020462 A | 10/2016 |
| CN | 106095297 A | 11/2016 |
| CN | 106303088 A | 1/2017 |
| CN | 107645601 A | 1/2018 |
| CN | 108521505 A | 9/2018 |
| CN | 109361822 A | 2/2019 |
| CN | 110012258 A | 7/2019 |
| CN | 110602330 A | 12/2019 |

* cited by examiner

Electronic device 100

INCOMING CALL VOLUME CONTROL METHOD AND ELECTRONIC DEVICE

CROSS-REFERENCE TO RELATED APPLICATIONS

This application is a national stage of International Application No. PCT/CN2022/093156, filed on May 16, 2022, which claims priority to Chinese Patent Application No. 202110924918.5, filed on Aug. 12, 2021. The disclosures of both of the aforementioned applications are hereby incorporated by reference in their entireties.

TECHNICAL FIELD

This application relates to the field of terminal devices, and in particular, to an incoming call volume control method and an electronic device.

BACKGROUND

Currently, when a mobile phone receives an incoming call, if the user wants to mute the incoming call or reduce a volume of the incoming call, the user needs operate a muting button (such as a power-on button) or adjust a volume button to adjust the volume of the incoming call. However, in a scenario in which it is inconvenient for the user to operate the mobile phone, manually adjusting the volume affects user experience.

SUMMARY

In order to resolve the foregoing problem, this application provides an incoming call volume control method and an electronic device. In the method, the electronic device may control an incoming call volume based on biological feature information, thereby improving user experience.

In a first aspect, this application provides an electronic device. The method includes: one or more processors, a memory, and a fingerprint sensor; and one or more computer programs, where the one or more computer programs are stored in the memory, and when the computer programs are executed by the one or more processors, the electronic device is caused to perform the following steps: receiving first incoming call information when an electronic device is in a screen off state; in response to the received first incoming call information, switching, by the electronic device, the screen off state to a screen on state, and playing an incoming call ringtone, where the incoming call ringtone is at a first volume; starting a first detection when it is detected that an optical proximity sensor of the electronic device satisfies a first preset condition, where a duration of the first detection is a first duration; detecting biological feature information during the first detection; ending the first detection, and starting a second detection, where a time difference between an end moment of the first detection and a start moment of the second detection is a second duration; and adjusting the first volume of the incoming call ringtone to a second volume when first target biological feature information is detected at a first moment during the second detection, where the second volume is less than the first volume. In this way, the electronic device can monitor states of modules and components of the electronic device based on set conditions, and start to detect biological feature information only when the set conditions are satisfied, thereby avoiding a problem of high system power consumption caused by continuous detection, effectively reducing system power consumption, and reducing battery power consumption. The volume of the incoming call ringtone is reduced when specific biological feature information is detected, which provides a more convenient volume adjustment manner, thereby realizing reduction of the incoming call volume without operations performed by a user, and thus improving user experience.

For example, the preset condition corresponding to the optical proximity sensor is that the optical proximity sensor is not obstructed.

For example, if the optical proximity sensor does not satisfy the preset condition, the electronic device does not start the first detection.

For example, the first detection may optionally be a detection window of this application.

For example, the electronic device may collect the biological feature information through a camera.

For example, a frame rate for the camera to collect the biological feature information may be 5 fps, which reduces the system power consumption while ensuring detection efficiency and time relevancy.

For example, the second volume may be 0, that is, the incoming call is muted.

For example, the second volume may be greater than 0 and less than the first volume.

According to the first aspect, when the computer programs are executed by the one or more processors, the electronic device is caused to perform the following step: ending the second detection when first target biological feature information is detected. In this way, the electronic device may end the current detection after detecting the biological feature information, to reduce the power consumption.

According to the first aspect or any implementation of the first aspect, when the computer programs are executed by the one or more processors, the electronic device is caused to perform the following steps: receiving second incoming call information when the electronic device is in the screen on state; playing the incoming call ringtone in response to the received second incoming call information, where the incoming call ringtone is at the first volume; starting a third detection when it is detected that an optical proximity sensor of the electronic device satisfies a first preset condition, where a duration of the third detection is a first duration; detecting biological feature information during the third detection; ending the third detection, and starting a fourth detection, where a time difference between an end moment of the third detection and a start moment of the fourth detection is a third duration, and a duration of the fourth detection is a fourth duration; detecting biological feature information during the fourth detection; ending the fourth detection, and starting a fifth detection, where a time difference between an end moment of the fourth detection and a start moment of the fifth detection is a fifth duration; and adjusting the first volume of the incoming call ringtone to the second volume when second target biological feature information is detected at a second moment during the fifth detection. Through the plurality of detections, the electronic device can ensure time relevancy of the biological feature information.

According to the first aspect or any implementation of the first aspect, the third duration is different from the second duration. By setting the intervals between the detections, the electronic device can realize different power consumption control effects. For example, a larger interval means lower power consumption.

According to the first aspect or any implementation of the first aspect, the fourth duration is less than the first duration. By setting the intervals between the detections, the electronic device can realize different power consumption control effects. For example, a larger interval means lower power consumption. For example, the electronic device in this application may gradually increase the intervals between the detections to reduce the power consumption.

According to the first aspect or any implementation of the first aspect, the fifth duration is greater than the third duration. For example, the electronic device may gradually increase the intervals between the detections. For example, the intervals between the detections may be gradually increased from 1 s to 2 s.

According to the first aspect or any implementation of the first aspect, a duration of the fifth detection is a sixth duration, and the sixth duration is less than the fourth duration. By shortening the detection time, the electronic device can further reduce the power consumption, thereby reducing the battery power consumption.

According to the first aspect or any implementation of the first aspect, when the computer programs are executed by the one or more processors, the electronic device is caused to perform the following step: ending the fifth detection when the second target biological feature information is detected.

According to the first aspect or any implementation of the first aspect, when the computer programs are executed by the one or more processors, the electronic device is caused to perform the following steps: receiving third incoming call information when the electronic device is in the screen on state; playing the incoming call ringtone in response to the received third incoming call information, where the incoming call ringtone is at the first volume; starting a sixth detection when it is detected that the optical proximity sensor of the electronic device satisfies the first preset condition, where a duration of the sixth detection is the first duration; detecting biological feature information during the sixth detection; ending the sixth detection, and starting a seventh detection, where a time difference between an end moment of the sixth detection and a start moment of the seventh detection is a sixth duration, and a duration of the seventh detection is a seventh duration; detecting biological feature information during the seventh detection; starting an eighth detection when the seventh detection ends, where a time difference between an end moment of the seventh detection and a start moment of the eighth detection is an eighth duration, and a duration of the eighth detection is a ninth duration; ending the eighth detection, and starting a ninth detection, where a duration of the ninth detection is the first duration; detecting biological feature information during the ninth detection; and adjusting the first volume of the incoming call ringtone to the second volume when third target biological feature information is detected at a third moment during the ninth detection. In this way, the electronic device may set a plurality of detection cycles to realize cyclic detection, thereby reducing the system power consumption while ensuring the time relevancy.

According to the first aspect or any implementation of the first aspect, when the computer programs are executed by the one or more processors, the electronic device is caused to perform the following steps: receiving fourth incoming call information when the electronic device is screen on state; playing the incoming call ringtone in response to the received fourth incoming call information, where the incoming call ringtone is at the first volume; starting a tenth detection when it is detected that the optical proximity sensor of the electronic device satisfies the first preset condition, where a duration of the tenth detection is the first duration; and adjusting the first volume of the incoming call ringtone to the second volume at a fourth moment during the tenth detection when it is detected that the optical proximity sensor satisfies a second preset condition. In this way, the electronic device may further monitor the state of the optical proximity sensor while detecting the biological feature information. If the optical proximity sensor is obstructed, for example, if a user places a mobile phone on a table top with a front facing the table top, the incoming call volume may be reduced.

According to the first aspect or any implementation of the first aspect, when the computer programs are executed by the one or more processors, the electronic device is caused to perform the following steps: receiving fifth incoming call information when the electronic device is screen on state; playing the incoming call ringtone in response to the received fifth incoming call information, where the incoming call ringtone is at the first volume; starting an eleventh detection when it is detected that the optical proximity sensor of electronic device satisfies the first preset condition, where a duration of the eleventh detection is first duration; and stopping playing the incoming call ringtone during the eleventh detection when it is detected that the incoming call information satisfies a third preset condition. In this way, during the biological feature detection, the electronic device may further monitor the state of the incoming call to perform corresponding actions based on different states.

For example, when it is detected that the incoming call information satisfies the third preset condition, the eleventh detection is ended. This further reduces the system power consumption of the detection.

According to the first aspect or any implementation of the first aspect, the third preset condition includes: an incoming call is hung up, the incoming call is answered, or the incoming call ends.

According to the first aspect or any implementation of the first aspect, the first target biological feature information is human eye feature information. In this way, in this application, through recognition of human eye gazing, the incoming call ringtone may be adjusted when it is determined that a user gazes at the screen.

In a second aspect, this application provides an incoming call volume control method. The method is applicable to an electronic device. The method includes: receiving first incoming call information when the electronic device is in a screen off state; in response to the received first incoming call information, switching, by the electronic device, the screen off state to a screen on state, and playing an incoming call ringtone, where the incoming call ringtone is at a first volume; starting a first detection when it is detected that an optical proximity sensor of the electronic device satisfies a first preset condition, where a duration of the first detection is a first duration; detecting biological feature information during the first detection; ending the first detection, and starting a second detection, where a time difference between an end moment of the first detection and a start moment of the second detection is a second duration; and adjusting the first volume of the incoming call ringtone to a second volume when first target biological feature information is detected at a first moment during the second detection, where the second volume is less than the first volume.

According to the second aspect, the method includes: ending the second detection when first target biological feature information is detected.

According to the second aspect or any implementation of the second aspect, the method includes: receiving second incoming call information when the electronic device is in the screen on state; playing the incoming call ringtone in response to the received second incoming call information, where the incoming call ringtone is at the first volume; starting a third detection when it is detected that an optical proximity sensor of the electronic device satisfies a first preset condition, where a duration of the third detection is a first duration; detecting biological feature information during the third detection; ending the third detection, and starting a fourth detection, where a time difference between an end moment of the third detection and a start moment of the fourth detection is a third duration, and a duration of the fourth detection is a fourth duration; detecting biological feature information during the fourth detection; ending the fourth detection, and starting a fifth detection, where a time difference between an end moment of the fourth detection and a start moment of the fifth detection is a fifth duration; and adjusting the first volume of the incoming call ringtone to the second volume when second target biological feature information is detected at a second moment during the fifth detection.

According to the second aspect or any implementation of the second aspect, the third duration is different from the second duration.

According to the second aspect or any implementation of the second aspect, the fourth duration is less than the first duration.

According to the second aspect or any implementation of the second aspect, the fifth duration is greater than the third duration.

According to the second aspect or any implementation of the second aspect, a duration of the fifth detection is a sixth duration, and the sixth duration is less than the fourth duration.

According to the second aspect or any implementation of the second aspect, the method includes: ending the fifth detection when the second target biological feature information is detected.

According to the second aspect or any implementation of the second aspect, the method includes: receiving third incoming call information when the electronic device is in the screen on state; playing the incoming call ringtone in response to the received third incoming call information, where the incoming call ringtone is at the first volume; starting a sixth detection when it is detected that the optical proximity sensor of the electronic device satisfies the first preset condition, where a duration of the sixth detection is the first duration; detecting biological feature information during the sixth detection; ending the sixth detection, and starting a seventh detection, where a time difference between an end moment of the sixth detection and a start moment of the seventh detection is a sixth duration, and a duration of the seventh detection is a seventh duration; detecting biological feature information during the seventh detection; starting an eighth detection when the seventh detection ends, where a time difference between an end moment of the seventh detection and a start moment of the eighth detection is an eighth duration, and a duration of the eighth detection is a ninth duration; ending the eighth detection, and starting a ninth detection, where a duration of the ninth detection is the first duration; detecting biological feature information during the ninth detection; and adjusting the first volume of the incoming call ringtone to the second volume when third target biological feature information is detected at a third moment during the ninth detection.

According to the second aspect or any implementation of the second aspect, the method includes: receiving fourth incoming call information when the electronic device is screen on state; playing the incoming call ringtone in response to the received fourth incoming call information, where the incoming call ringtone is at the first volume; starting a tenth detection when it is detected that the optical proximity sensor of the electronic device satisfies the first preset condition, where a duration of the tenth detection is the first duration; and adjusting the first volume of the incoming call ringtone to the second volume at a fourth moment during the tenth detection when it is detected that the optical proximity sensor satisfies a second preset condition.

According to the second aspect or any implementation of the second aspect, the method includes: receiving fifth incoming call information when the electronic device is screen on state; playing the incoming call ringtone in response to the received fifth incoming call information, where the incoming call ringtone is at the first volume; starting an eleventh detection when it is detected that the optical proximity sensor of electronic device satisfies the first preset condition, where a duration of the eleventh detection is first duration; and stopping playing the incoming call ringtone during the eleventh detection when it is detected that the incoming call information satisfies a third preset condition.

According to the second aspect or any implementation of the second aspect, the third preset condition includes: an incoming call is hung up, the incoming call is answered, or the incoming call ends.

According to the second aspect or any implementation of the second aspect, the first target biological feature information is human eye feature information.

The second aspect and any implementation of the second aspect correspond to the first aspect and any implementation of the first aspect respectively. For technical effects of the second aspect and any implementation of the second aspect, refer to the technical effects corresponding to the first aspect and any implementation of the first aspect. Details are not described herein.

In a third aspect, this application provides a computer-readable medium configured to store a computer program. The computer program includes instructions for performing the method in the second aspect or any possible implementation of the second aspect.

In a fourth aspect, this application provides a computer program. The computer program includes instructions for performing the method in the second aspect or any possible implementation of the second aspect.

In a fifth aspect, this application provides a chip. The chip includes a processing circuit and a transceiver pin. The transceiver pin and the processing circuit communicate with each other through an internal connection path. The processing circuit performs the method in the second aspect or any possible implementation of the second aspect to control a receive pin to receive a signal and control a transmit pin to transmit the signal.

DESCRIPTION OF EMBODIMENTS

The technical solutions in embodiments of this application are clearly and completely described in the following with reference to the accompanying drawings in embodiments of this application. Apparently, the described embodiments are merely some rather than all of the embodiments of this application. All other embodiments obtained by a person of ordinary skill in the art based on embodiments of this application without making creative efforts fall within the protection scope of this application.

The term "and/or" herein describes only an association relationship for describing associated objects and represents that three relationships may exist. For example, A and/or B may represent: only A exists, both A and B exist, and only B exists.

The terms "first", "second", and the like in the specification and claims of embodiments of this application are used to distinguish between different objects, and are not used to indicate a specific sequence of objects. For example, a first target object and a second target object are used to distinguish between different target objects, but are not used to describe a specific sequence of the target objects.

In embodiments of this application, a word such as "in an example" or "for example" is used to represent giving an example, an illustration, or a description. Any embodiment or design scheme described as "in an example" or "for example" in embodiments of this application is not explained as being preferential or having more advantages than another embodiment or design scheme. Exactly, use of the word such as "in an example" or "for example" is intended to present a concept in a specific manner.

In the descriptions of embodiments of this application, unless otherwise specified, "a plurality of" means two or more. For example, a plurality of processing units mean two or more processing units. A plurality of systems mean two or more systems.

Figure 1:
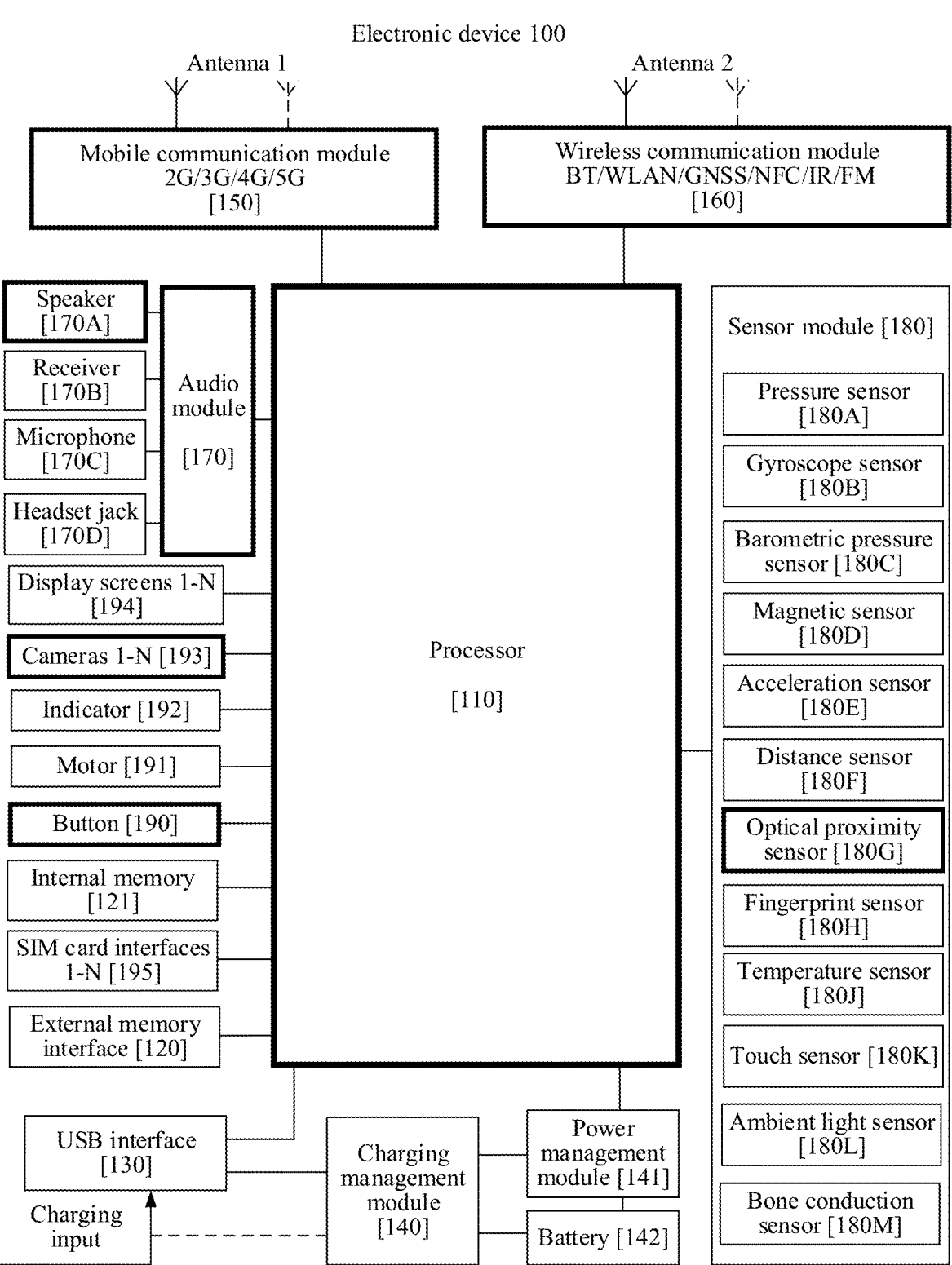
FIG. 1 is an example schematic diagram of a hardware structure of an electronic device.

FIG. 1 is a schematic structural diagram of an electronic device 100. It should be understood that the electronic device 100 shown in FIG. 1 is merely an example of the electronic device, and the electronic device 100 may have more or fewer components than those shown in the figure, or may have a combination of two or more components, or may have different component configurations. Various components shown in FIG. 1 may be implemented by hardware that includes one or more signal processors and/or application-specific integrated circuits, software, or a combination of hardware and software. In this embodiment of this application, description is made by using an example in which the terminal device is a mobile phone. In other embodiments, the electronic device may be devices that can play a sound such as a television, a smart home device, or a watch.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device 100. The controller may generate an operation control signal based on an instruction operation code and a timing signal, to control instruction fetch and instruction execution.

A memory may be further disposed in the processor 110, and is configured to store instructions and data. In some embodiments, the memory in the processor 110 is a cache. The memory may store instructions or data recently used or repeatedly used by the processor 110. If the processor 110 needs to use the instructions or the data again, the processor may directly call the instructions or the data from the memory. This avoids repeated access, and reduces a waiting time of the processor 110, thereby improving system efficiency.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, and includes a serial data line (serial data line, SDA) and a serial clock line (derail clock line, DCL). In some embodiments, the processor 110 may include a plurality sets of I2C buses. The processor 110 may be coupled to the touch sensor 180K, a charger, a flash, the camera 193, and the like through different I2C bus interfaces respectively. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality sets of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

It may be understood that an interface connection relationship between the modules illustrated in embodiments of this application is merely an example for description, and constitutes no limitation on the structure of the electronic device 100. In some other embodiments of this application, the electronic device 100 may an interface connection manner different from that in the foregoing embodiment, or use a combination of a plurality of the interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. When charging the battery 142, the charging management module 140 may further supply power to the electronic device through the power management module 141.

The power supply management module 141 is configured to connect to the battery 142, the charge management module 140, and the processor 110. The power management module 141 receives an input of the battery 142 and/or the charging management module 140, to supply power to the processor 110, the internal memory 121, an external memory, the display screen 194, the camera 193, the wireless communication module 160, and the like. The power management module 141 may be further configured to monitor parameters such as battery capacity, a battery cycle count, a battery state of health (electric leakage and impedance). In some other embodiments, the power management module 141 may be disposed in the processor 110. In some other embodiments, the power management module 141 and the charging management module 140 may be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna of the electronic device 100 may be configured to cover one or more communication frequency bands. Different antennas may be multiplexed to increase an antenna utilization. For example, the antenna 1 may be multiplexed into a diversity antenna of a wireless local area network. In some other embodiments, the antenna may be used together with a tuning switch.

The mobile communication module 150 may provide a wireless communication solution including 2G/3G/4G/5G and the like applicable to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor (Modem) may include a modulator and a demodulator. The modulator is configured to modulate a to-be-transmitted low frequency baseband signal into a medium-high frequency signal. The demodulator is configured to demodulate a received electromagnetic wave signal into a low-frequency baseband signal. Then the demodulator transmits the demodulated low-frequency baseband signal to the baseband processor for processing. The low-frequency baseband signal is processed by the baseband processor and then transmitted to the application processor. The application processor outputs a sound signal through an audio device (not limited to the speaker 170A and the receiver 170B), or displays an image or a video through the display screen 194. In some embodiments, the modem processor may be an independent device. In some other embodiments, the modem processor may be independent of the processor 110, and may be disposed in a same device as the mobile communication module 150 or another functional module.

The wireless communications module 160 may provide a wireless communication solution applicable to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), a frequency modulation (frequency modulation, FM), a near field communication (near field communication, NFC) technology, and an infrared (infrared, IR) technology.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology.

The electronic device 100 implements a display function through the GPU, the display screen 194, the application processor, and the like. The GPU is an image processing microprocessor, and is connected to the display screen 194 and the application processor. The GPU is configured to perform mathematical and geometric calculations and graphics rendering. The processor 110 may include one or more GPUs and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Mini-LED, a MicroLED, a Micro-OLED, a quantum dot light emitting diode (quantum dot light emitting diodes, QLED), or the like. In some embodiments, the electronic device 100 may include 1 or N displays 194. N is a positive integer greater than 1.

The electronic device 100 may implement a photographing function through the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transmits the electrical signal to the ISP for processing, and therefore, the electrical signal is converted into an image visible to a naked eye. The ISP may further perform algorithm optimization on a noise point, a brightness, and a skin tone of the image. The ISP may further optimize parameters such as an exposure and a color temperature of a to-be-photographed scene. In some embodiments, the ISP may be disposed in the camera 193.

The camera 193 is configured to capture a static image or video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include 1 or N cameras 193. N is a positive integer greater than 1. In embodiments of this application, a frame rate of the camera 193, that is, a number of images collected per second, may be 5 fps, which means that 5 image frames are collected per second. In other embodiments, the frame rate of camera 193 may be another value, such as 20 fps or 60 fps, which is not limited in this application. Optionally, in embodiments of this application, the camera 193 may be called by another application, such as the camera application, while being called by a ringtone volume reduction application, which is not limited in this application.

The external memory interface 120 may be configured to connect to an external storage card such as a Micro SD card, to increase a storage capacity of the electronic device 100. The external storage card communicates with the processor 110 through the external memory interface 120, to implement a data storage function. For example, files such as music and videos are stored in the external storage card.

The internal memory 121 may be configured to store computer-executable program code, and the executable program code includes instructions. The processor 110 executes various function applications and data processing of the electronic device 100 by running the instructions stored in the internal memory 121. The internal memory 121 may include a program storage area and a data storage area. The program storage area may store an operating system, an application required for at least one function (such as a sound playback function and an image display function), and the like. The data storage area may store data (such as audio data and an address book) created during use of the electronic device 100, and the like. In addition, the internal memory 121 may include a high-speed random access memory, and may further include a non-volatile memory, for example, at least one disk storage device, a flash memory device, or a universal flash storage (universal flash storage, UFS).

The electronic device 100 may implement an audio function, for example, music playback and recording, through the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as "horn", is configured to convert an electrical audio signal into a sound signal. The electronic device 100 may be used to listen to music or listen to a hands-free call through the speaker 170A. For example, in embodiments of this application, if the electronic device 100 receives an incoming call after the electronic device 100 enables a ringing function, a ringtone may be played through the speaker 170A. Optionally, the incoming call ringtone may be built-in or set by a user. For example, different ringtones may be set for different incoming call users.

The receiver 170B, also referred to as "handset", is configured to convert an electrical audio signal into a sound signal. When the electronic device 100 is used to answer a call or receive voice information, the receiver 170B may be put close to a human ear, to receive the voice information.

The microphone 170C, also referred to as "voice tube" or "mike", is configured to convert a sound signal into an electrical signal. When making a call or transmitting voice information, a user may make a sound by approaching the microphone 170C through the mouth of the user, to input a sound signal into the microphone 170C. At least one microphone 170C may be disposed in the electronic device 100.

In some other embodiments, two microphones 170C may be disposed in the electronic device 100, to collect a sound signal and implement a noise reduction function. In some other embodiments, three, four, or more microphones 170C may be disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert a pressure signal into an electrical signal. In some embodiments, the pressure sensor 180A may be disposed in the display screen 194. There are a plurality of types of pressure sensors 180A, such as a resistive pressure sensor, an inductive pressure sensor, and a capacitive pressure sensor. The capacitive pressure sensor may include at least two parallel plates including conductive materials. When a force is exerted on the pressure sensor 180A, a capacitance between electrodes changes. The electronic device 100 determines a pressure strength based on a change of the capacitance. When a touch operation is performed on the display screen 194, the electronic device 100 detects a strength of the touch operation through the pressure sensor 180A. The electronic device 100 may further calculate a position of the touch based on a detection signal of the pressure sensor 180A. In some embodiments, touch operations that are applied to a same touch position but have different touch operation strengths may correspond to different operation instructions. For example, when a touch operation having a touch operation strength less than a first pressure threshold is performed on an SMS message application icon, an instruction of viewing an SMS message is executed. When a touch operation having a touch operation strength greater than or equal to the first pressure threshold is performed on the SMS message application icon, an instruction of creating a new SMS message is executed.

The gyroscope sensor 180B may be configured to determine a motion posture of the electronic device 100.

The barometric pressure sensor 180C is configured to measure a barometric pressure. In some embodiments, the electronic device 100 calculates an altitude by using the barometric pressure value measured by the barometric pressure sensor 180C, to assist positioning and navigation.

The magnetic sensor 180D includes a Hall effect sensor. The electronic device 100 may detect opening and closing of a flip cover or a leather case through the magnetic sensor 180D.

The acceleration sensor 180E may detect magnitudes of accelerations of the electronic device 100 in various directions (generally on three axes). When the electronic device 100 is stationary, a magnitude and a direction of gravity may be detected. The acceleration sensor may be further configured to recognize a posture of the electronic device, and is applicable to applications such as switching between landscape and portrait modes and a pedometer.

The distance sensor 180F is configured to measure a distance. The electronic device 100 may measure a distance through infrared or laser. In some embodiments, in a photographing scenario, the electronic device 100 may measure a distance thorough the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 may emit infrared light through the light-emitting diode. The electronic device 100 detects infrared reflected light from a nearby object through the photodiode. When detecting sufficient reflected light, the electronic device 100 may determine that an object exists near the electronic device. When detecting insufficient reflected light, the electronic device 100 may determine that no object exists near the electronic device 100. The electronic device 100 may detect, through the optical proximity sensor 180G, that a user holds the electronic device 100 close to an ear for a call, so that automatic screen off is implemented to achieve power saving. The optical proximity sensor 180G may alternatively be used in a leather case mode or a pocket mode to automatically unlock or lock the screen.

The ambient light sensor 180L is configured to sense a luminance of ambient light.

The fingerprint sensor 180H is configured to collect a fingerprint. The electronic device 100 may implement fingerprint unlocking, application lock accessing, fingerprint photographing, fingerprint-based call answer, and the like by using a feature of the collected fingerprint.

The temperature sensor 180J is configured to detect a temperature.

The touch sensor 180K is also referred to as a "touch panel". The touch sensor 180K may be disposed on the display screen 194. The touch sensor 180K and the display screen 194 form a touchscreen, which is also referred to as a "touch control screen". The touch sensor 180K is configured to detect a touch operation performed on or near the touch sensor. The touch sensor may transmit the detected touch operation to the application processor to determine a type of the touch event. The touch sensor may provide a visual output related to the touch operation through the display screen 194. In some other embodiments, the touch sensor 180K may be alternatively disposed on a surface of the electronic device 100, and is at a position different from that of the display screen 194.

The bone conduction sensor 180M may obtain a vibration signal. In some embodiments, the bone conduction sensor 180M may obtain a vibration signal of a vibration bone of a human vocal-cord part.

The button 190 includes a power-on button, a volume button, and the like. The button 190 may be a mechanical button, or may be a touch button. The electronic device 100 may receive a button input, and generate a button signal input related to user setting and function control of the electronic device 100.

The SIM card interface 195 is configured to connect to a SIM card. The SIM card may be inserted into the SIM card interface 195 or removed from the SIM card interface 195, to come into contact with or be separated from the electronic device 100. The electronic device 100 may support 1 or N SIM card interfaces. N is a positive integer greater than 1. The SIM card interface 195 may support a Nano SIM card, a Micro SIM card, a SIM card, and the like. A plurality of cards may be simultaneously inserted into one SIM card interface 195. The plurality of cards may be of a same type or different types. The SIM card interface 195 may be compatible with different types of SIM cards. The SIM card interface 195 may be compatible with an external storage card. The electronic device 100 interacts with the network through the SIM card to implement functions such as call and data communication. In some embodiments, the electronic device 100 uses an eSIM, that is, an embedded SIM card. The eSIM card may be embedded in the electronic device 100 and cannot be separated from the electronic device 100.

A software system of the electronic device 100 may use a layered architecture, an event-driven architecture, a micro-kernel architecture, a micro service architecture, or a cloud architecture. In this embodiment of this application, the software structure of the electronic device 100 is illustrated by using an Android system with a layered architecture as an example.

Figure 2:
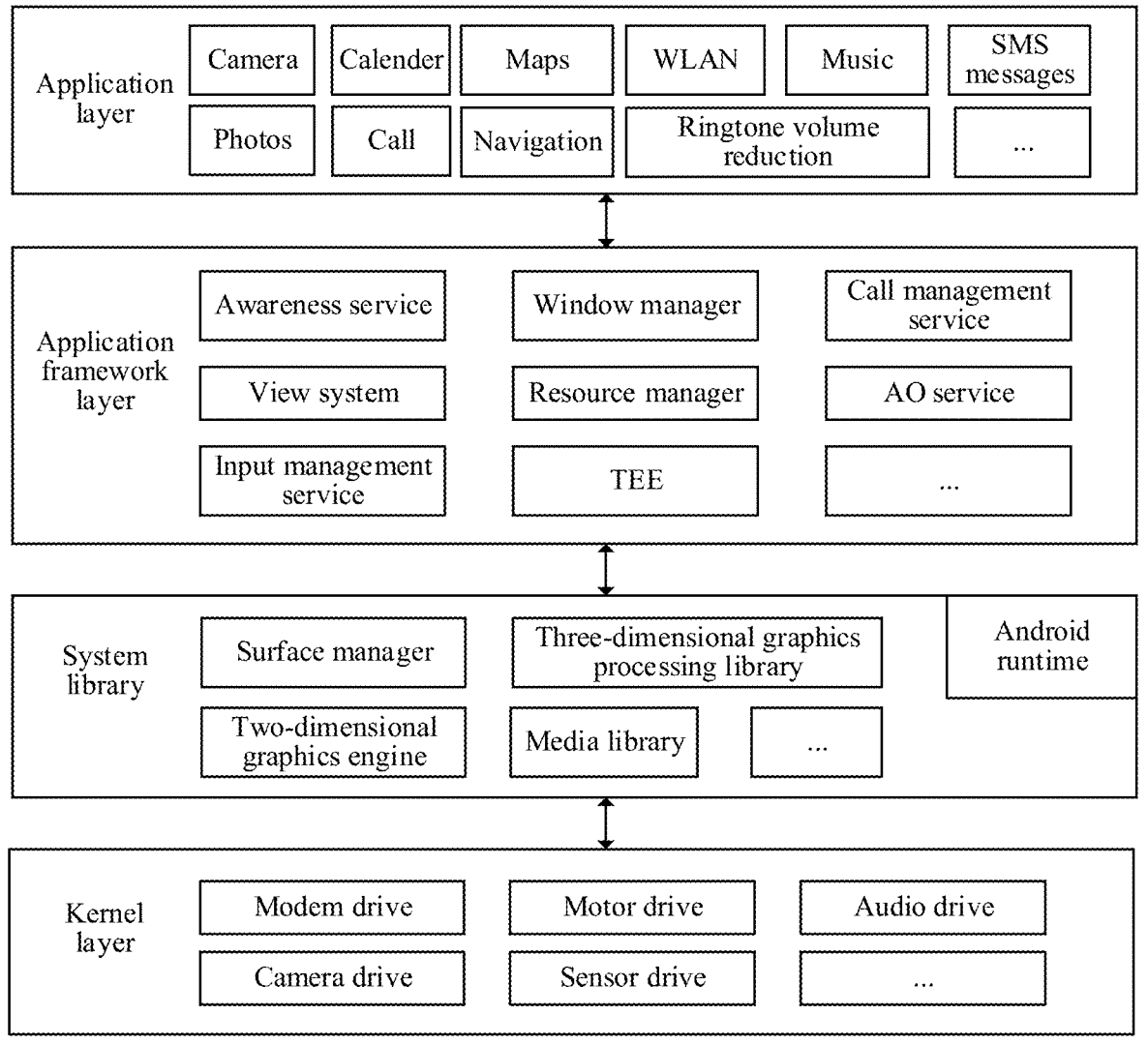
FIG. 2 is an example schematic diagram of software of the electronic device.

FIG. 2 is a block diagram of the software structure of the electronic device 100 according to an embodiment of this application.

In the layered architecture of the mobile phone 100, software is divided into several layers, and each layer has a clear role and task. The layers communicate with each other through a software interface. In some embodiments, the Android system is divided into four layers from top to bottom: an application layer, an application framework layer, an Android runtime (Android runtime) and system library, and a kernel layer.

The application layer may include a series of application packages.

As shown in FIG. 2, the application packages may include applications such as camera, photos, calendar, phone, maps, navigation, WLAN, Bluetooth, music, videos, SMS messages, and ringtone volume reduction. For example, the ringtone volume reduction application program (referred to as a ringtone volume reduction application) may be configured to control the electronic device to detect ringtone volume reduction, so as to control the electronic device to adjust the volume of the incoming call ringtone after the incoming call rings.

The application framework layer provides an application programming interface (application programming interface, API) and a programming framework for the applications at the application layer. The application framework layer includes predefined functions.

As shown in FIG. 2, the application framework layer may include but is not limited to a window manager, a content provider, a view system, a call management service, a resource manager, a trusted execution environment (trusted execution environment, TEE), an input manager service (Input Manager Service), an AO (always on, always on, also referred to as no-screen off) service, an awareness service, a notification manager, and the like.

The window manager is configured to manage a window application. The window manager may obtain a size of the display screen, determine whether a status bar exists, perform screen locking, take a screenshot of the screen, and the like.

The content provider is configured to store and obtain data and make the data accessible to an application. The data may include a video, an image, an audio, calls that are made and answered, a browsing history and a bookmark, a phonebook, and the like.

The view system includes visual controls such as a control for displaying a text and a control for displaying an image. The view system may be configured to construct an application. A display interface may be composed of one or more views. For example, a display interface including an SMS message notification icon may include a view for displaying a text and a view for displaying a picture.

The phone manager is configured to provide a communication function of the electronic device 100, for example, management of a call state (including getting through, hang-up, and the like).

The resource manager provides various resources such as a localized character string, an icon, a picture, a layout file, and a video file for an application.

The notification manager enables an application to display notification information in the status bar to convey a message of a notification type. The message may disappear automatically after a short stay without requiring user interaction. For example, the notification manager is configured to provide a notification of download completion, a message notification, and the like. The notification manager may alternatively be a notification that appears on atop status bar of the system in the form of a graph or a scroll bar text, for example, a notification of an application running on the background, or may be a notification that appears on the screen in the form of a dialog window. For example, text information is prompted on the status bar, atone is made, the electronic device vibrates, or an indicator light flash.

The AO service, also referred to as a low power consumption AO service, recognizes presence of human eye gazing by using pre-stored detection algorithms such as a human face recognition algorithm and a human eye gazing recognition algorithm, and reports a recognition result to the awareness service after recognizing human eye gazing.

The awareness service is used for subscription management and interface provision. For example, the awareness service may be called by a plurality of applications or services. The awareness service may establish a corresponding process for each application or service through subscription management, and transmit data uploaded by an underlying module to different applications or services based on the corresponding processes of the applications or services. For example, the awareness service may provide an interface for an upper level application to call the underlying module based on requirements of the application.

The TEE is configured to isolate a high security sensitive application from a general software environment, provide a special trusted execution environment, and ensure confidentiality, integrity, and access rights of application resources and data. An application executed on the TEE side is referred to as a trusted application (TA), such as an application that executes key services such as signing and encryption and decryption calculations. Since the TA operates in the trusted execution environment (TEE), TA deployment/upgrade operations need to strictly follow security verification specifications of a TEE issuer (which is generally a terminal manufacturer), such as use of digital signatures and other measures, to ensure that all processes of the TEE are truly trusted. Optionally, in this embodiment of this application, the TEE may be configured to store images captured by the camera to ensure user privacy. The AO service may detect graphics in the TEE trough a detection algorithm to determine whether the images include human faces and whether gazing exists. Specific details are described in the following embodiments.

The Android runtime includes a core library and a virtual machine. The Android runtime is responsible for scheduling and managing the Android system.

The core library includes two parts: a performance function that needs to be called by a java language and the core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and security and abnormality management, and garbage collection.

The system library may include a plurality of function modules, such as a surface manager (surface manager), a media library (Media Libraries), a three-dimensional graphics processing library (for example, OpenGL ES), and a 2D graphics engine (for example, SGL).

The surface manager is configured to manage a display subsystem, and provide a fusion of 2D and 3D layers for a plurality of applications.

The media library supports playback and recording in a plurality of common audio and video formats, and also support static image files and the like. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawings.

The kernel layer is a layer between hardware and software. The kernel layer includes at least a display drive, a camera drive, an audio drive, and a sensor drive.

It may be understood that the components included in the system framework layer, the system library, and the runtime layer shown in FIG. 2 do not constitute a specific limitation on the electronic device 100. In some other embodiments of this application, the electronic device 100 may include more or fewer components than those shown in the figure, or some components may be combined, or some components may be split, or different component arrangements may be used.

Figure 3:
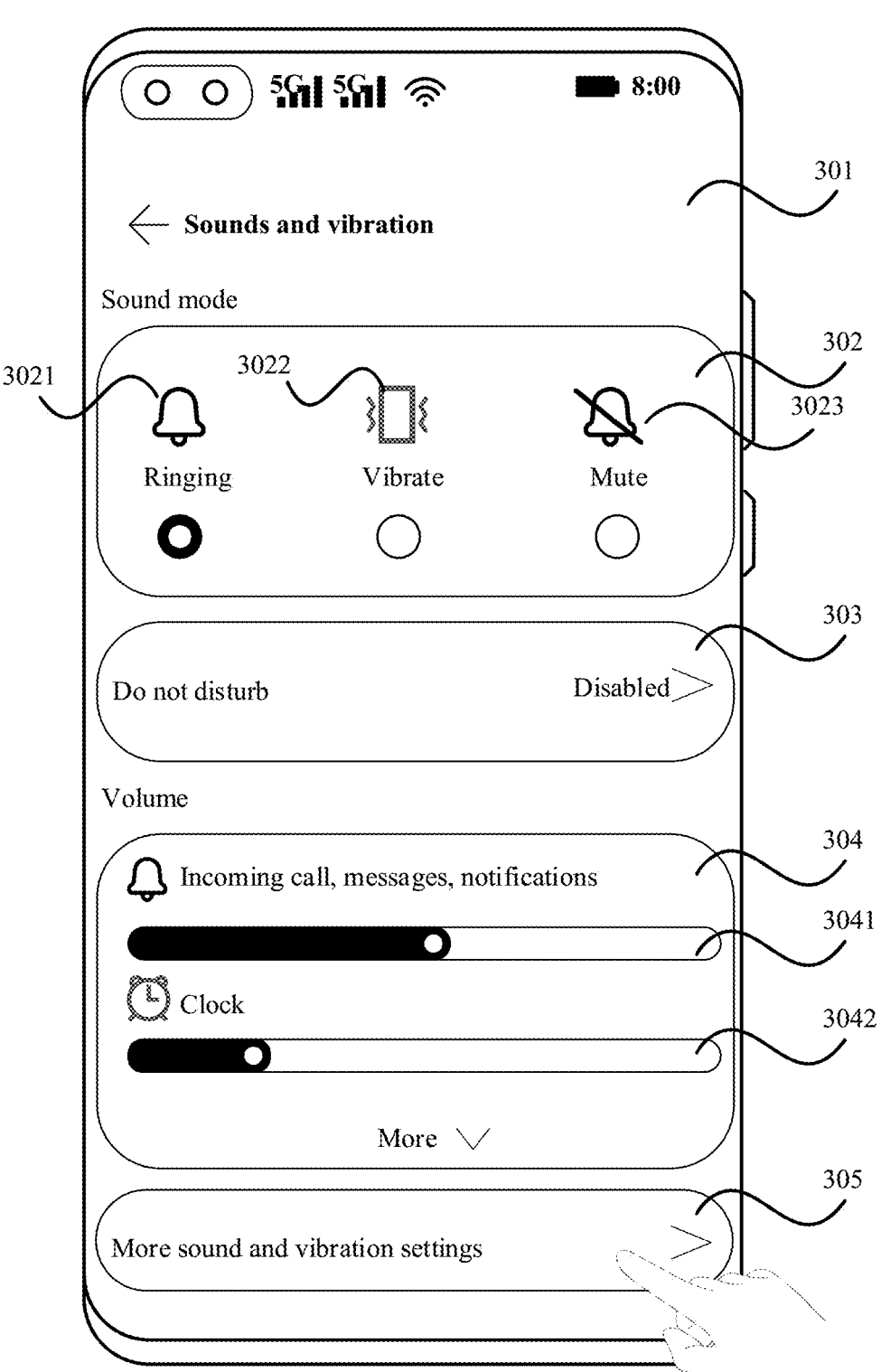
FIG. 3 is an example schematic diagram of a user interface.

FIG. 3 is an example schematic diagram of a user interface. Referring to FIG. 3, for example, a sound and vibration display interface 301 includes but is not limited to a sound mode option box 302, a do not disturb option box 304, a volume option box 305, and a more sound and vibration settings option box 308.

Optionally, the sound mode option box 302 includes but is not limited to a ringing option 3021, a vibration option 3022, a mute option 3023. For example, in this embodiment of this application, a user selects the ringing option 3021. Correspondingly, in response to the received selection operation performed by the user, a mobile phone marks the ringing option 3021 as selected (for example, an option corresponding to the ringing option 3021 is fully discolored or filled). When the mobile phone receives an incoming call, the mobile phone prompts the user that an incoming call is received through ringing. For example, if the user selects the vibration option 3022, when the mobile phone receives an incoming call, the mobile phone prompts the user that an incoming call is received through vibration (without ringing) For example, if the user selects the mute option 3023, when the mobile phone receives an incoming call, information of the incoming call is displayed on a screen without ringing or vibration. Optionally, the ringing option 3021, the vibration option 3022, and the mute option 3023 are single options. If the user expects the mobile phone to vibrate while ringing when receiving an incoming call, the user may tap the more sound and vibration settings option 305. It should be noted that in this embodiment of this application, the user enables both the ringing function and the vibration function, for example. A ringtone volume reduction solution in embodiments of this application is also applicable to a scenario in which only the ringing function is enabled and the vibration function is not enabled. Details are not repeated in this application.

Figure 4:
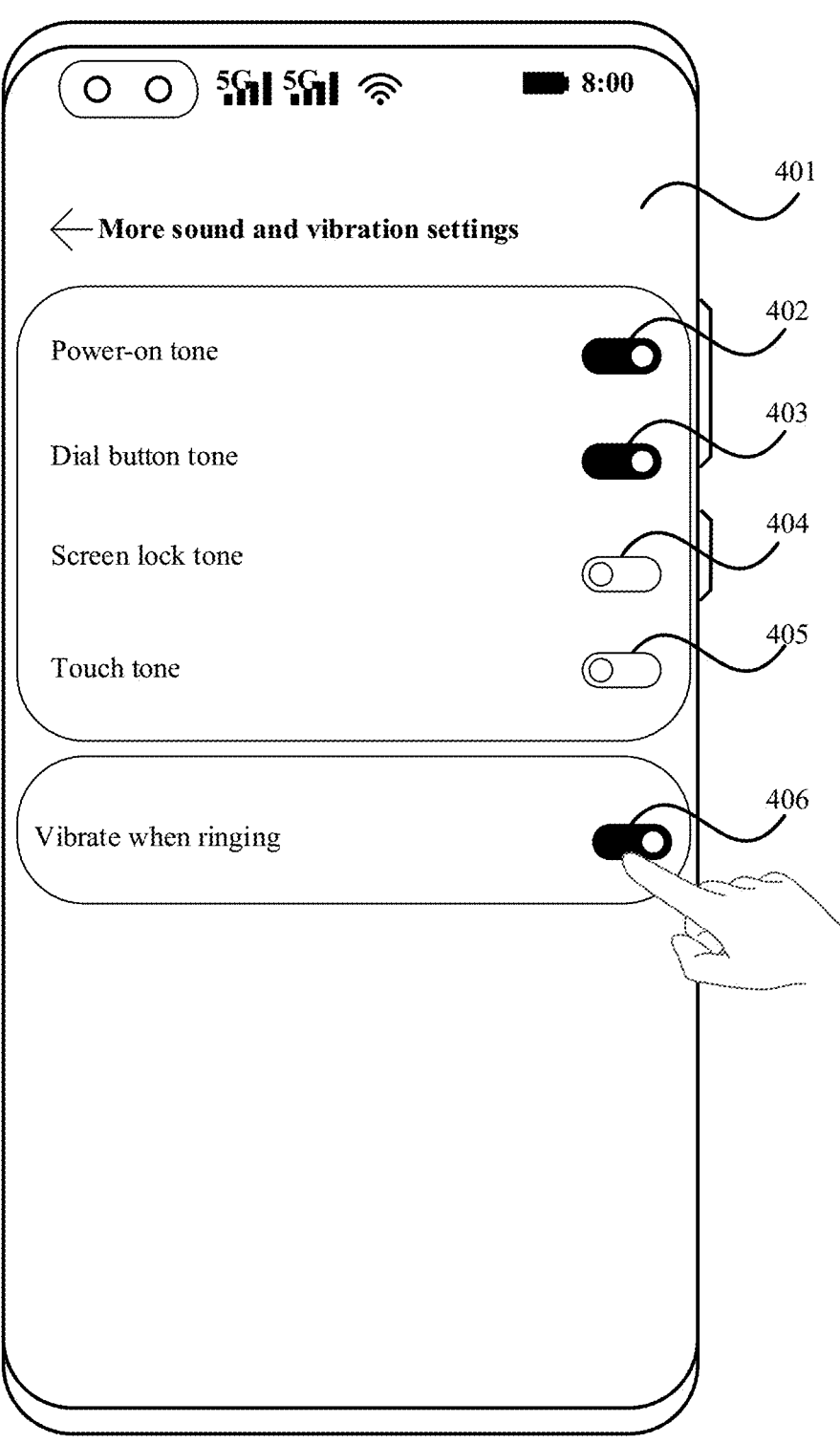
FIG. 4 is an example schematic diagram of a user interface.
Figure 5:
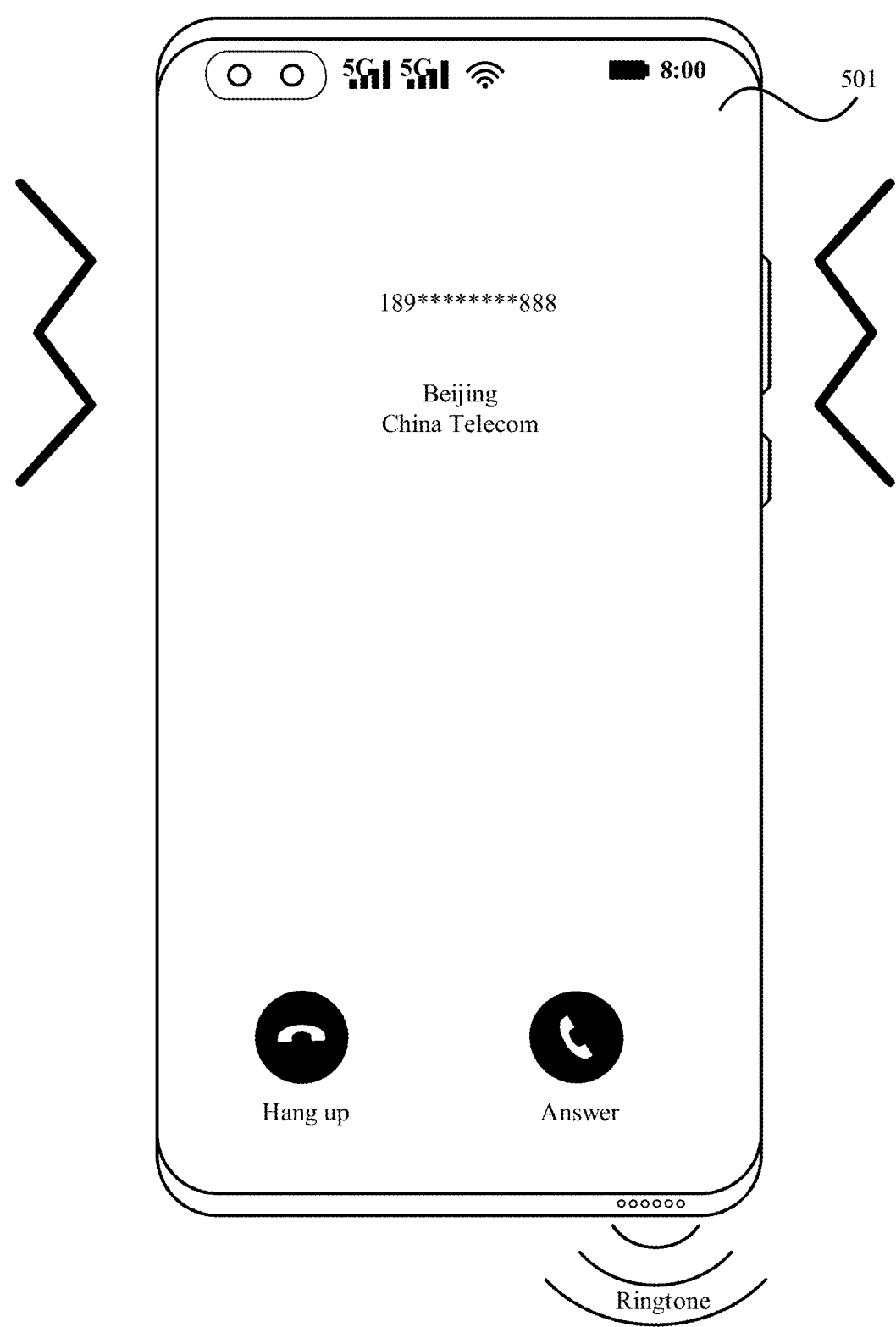
FIG. 5 is an example schematic diagram of a user interface.

Referring to FIG. 4, for example, the mobile phone displays a more sound and vibration display interface 401 in response to the received tapping operation performed by the user on the more sound and vibration settings option 305. Optionally, the more sound and vibration display interface 401 includes but is not limited to a power-on tone option 402, a dial button tone 403, a screen lock tone 404, a touch tone 405, and a vibrate when ringing option 406. For example, in this embodiment of this application, the power-on tone and the dial button tone are used as an example. When the ringing function of the mobile phone is enabled (that is, the ringing option 3021 is selected), if the user powers the mobile phone on or dials, the mobile phone plays the corresponding prompt tone through a speaker in response to the received operation performed by the user. For example, during power-on, a startup tone is emitted. For example, in this embodiment of this application, the user may tap the vibrate when ringing option 406. Correspondingly, as shown in FIG. 5, when the mobile phone receives an incoming call, the mobile phone displays an incoming call interface 501. The incoming call interface 501 includes but is not limited to callin information (including callin number, an operator of a caller, and a location of the caller), a hang up option, and an answer option. In addition, the mobile phone plays an incoming call ringtone through the speaker and vibrates through a motor (such as a motor 191 in FIG. 1) to prompt the user that an incoming call is received. It should be noted that the "incoming call" in the embodiment of this application may also be referred to as a call or a callin.

In this embodiment of this application, a manner of adjusting the incoming call ringtone is provided. It should be noted that in this embodiment of this application, an operator voice incoming call (also referred to as an operator voice call) is used as an example for description. In other embodiments, embodiments of this application are also applicable to prompt tone adjustment in any ringing scenario such as prompt tone adjustment for a voice call in a chat application or prompt tone adjustment for a video call in a chat application.

Figure 6:
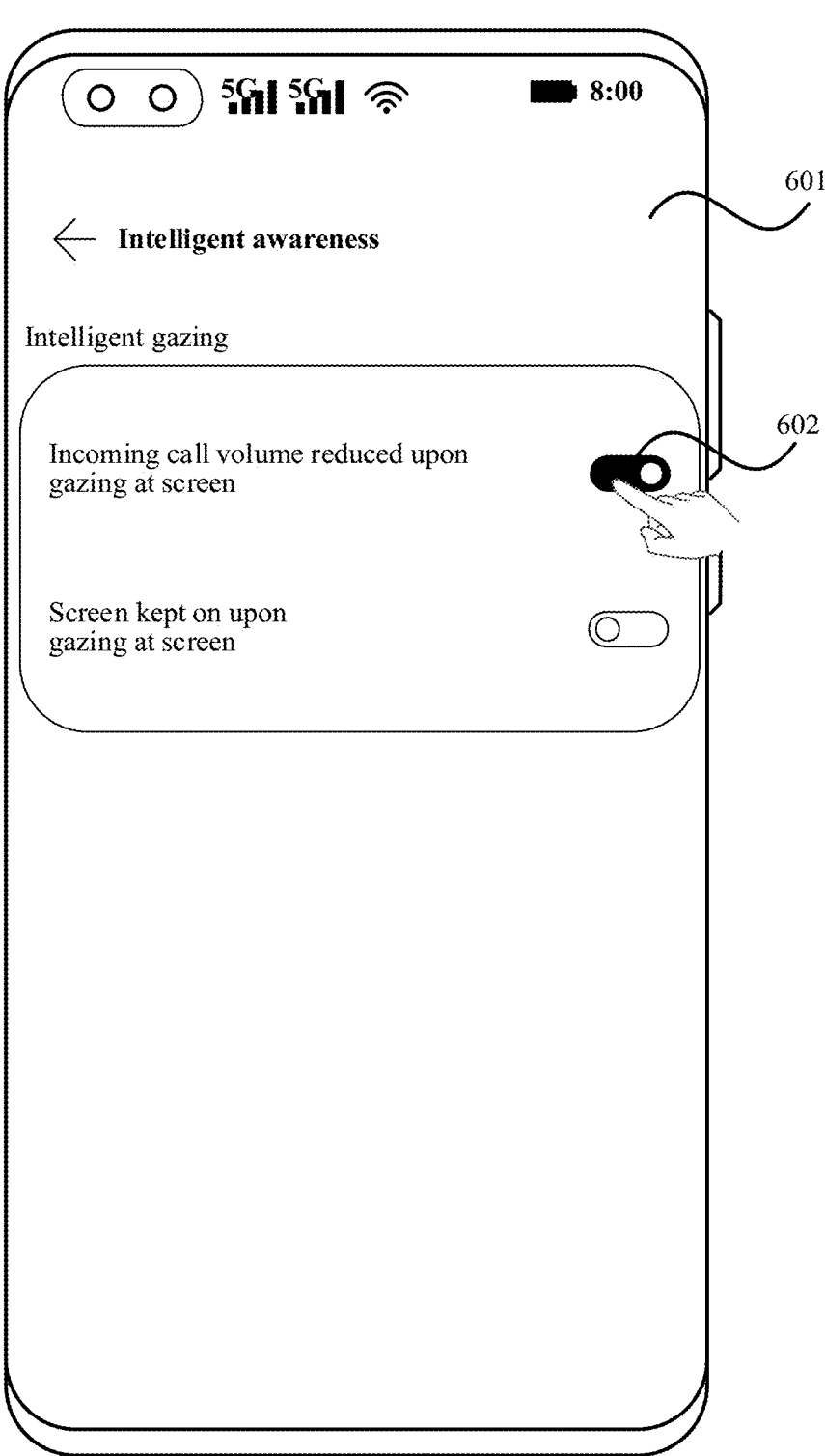
FIG. 6 is an example schematic diagram of a user interface.

FIG. 6 shows an example user interface. Referring to FIG. 6, for example, the user may enable an incoming call volume reduced upon gazing at screen function by tapping an incoming call volume reduced upon gazing at screen option 602 in an intelligent awareness display interface 601. It should be noted that in this implementation of this application, description is provided by using an incoming call volume reduced upon gazing at screen manner, for example. In other embodiments, the mobile phone may reduce incoming call volume by detecting specific voices. For different adjustment manners, the intelligent awareness display interface 601 may correspond to corresponding options. For example, the options may include an incoming call volume reduced upon detection of voice option and the like. A specific implementation thereof is similar to the incoming call volume reduced upon gazing at screen solution, and therefore is not repeated in this application.

In a possible implementation, when the user selects the ringing option 3021, the mobile phone may enable the incoming call volume reduced upon gazing at screen function by default in response to the received operation performed by the user. That is to say, the incoming call volume reduced upon gazing at screen option 602 is selected by default.

In another possible implementation, a region below the incoming call volume reduced upon gazing at screen option 602, for example, a region between the incoming call volume reduced upon gazing at screen option 602 and a screen kept on upon gazing at screen option, or a region between an intelligent gazing option box and a spacing gesture option box, may be configured to display camera authorization prompt information. The camera authorization prompt information is used to prompt the user that after the incoming call volume reduced upon gazing at screen option 602 is enabled, the service will enable a permission to use the camera.

In still another possible implementation, when the user taps the incoming call volume reduced upon gazing at screen option 602, a prompt box may be displayed in the intelligent awareness display interface 601. A location and a size of the prompt box may be set based on actual requirements, which are not limited in this application. For example, the prompt box may include the camera authorization prompt information.

Figure 7:
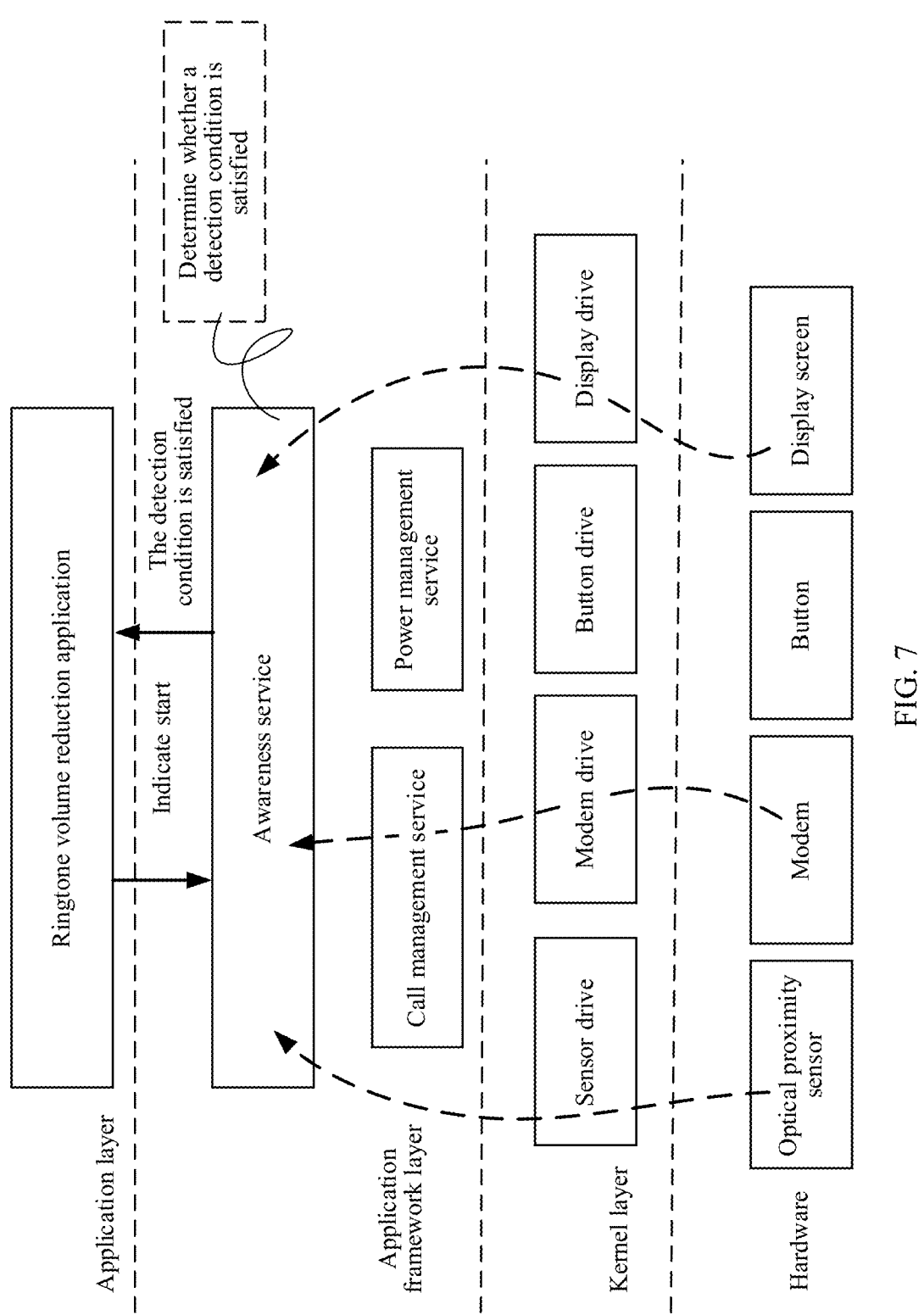
FIG. 7 is an example schematic diagram of module interaction.

FIG. 7 is an example schematic diagram of module interaction. Referring to FIG. 7, for example, the ringtone volume reduction application determines that a ringtone volume reduction function needs to be enabled in response to the received operation of tapping the incoming call volume reduced upon gazing at screen option 602 performed by the user. The ringtone volume reduction application transmits indication information to the awareness service to indicate that the awareness service should perform a detection condition determination. The incoming call volume reduced upon gazing at screen solution is used as an example. The awareness service controls the speaker to reduce the incoming call volume only after detecting that the user gazes at the screen. Before the foregoing operation, the awareness service needs to perform the detection condition determination, to determine whether gazing at screen detection needs to be performed. That is to say, when the detection condition determination succeeds, that is, when a detection condition is satisfied, the awareness service starts gazing at screen detection. When the detection condition determination fails, that is, the detection condition is not satisfied, the awareness service does not start gazing at screen detection. Through a power control solution, a problem of excessively high power consumption and excessively fast battery consumption caused by continuous gazing at screen detection can be effectively reduced.

Figure 8:
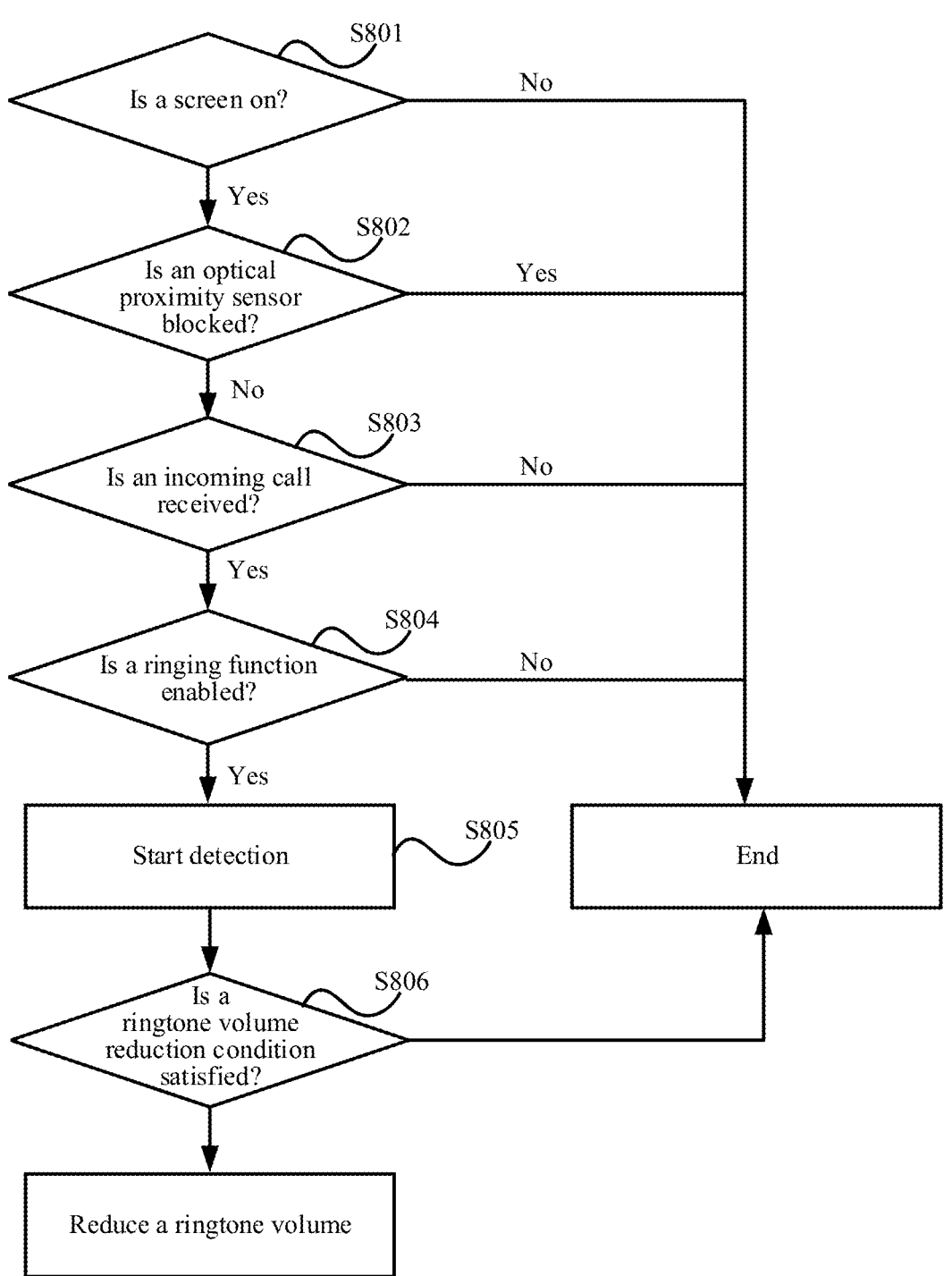
FIG. 8 is an example schematic flowchart of condition detection.

A process of the condition detection performed by the awareness service is described below with reference to FIG. 7 and FIG. 8. Referring to FIG. 8, for example, the process specifically includes the following steps:

S801: The awareness service determines whether the screen is on.

For example, referring to FIG. 7, the awareness service obtains a state of a display screen through the display drive in response to an instruction of the ringtone volume reduction application. Optionally, the state of the display screen may include screen off, screen half off, and screen on. Screen on further includes screen locked and screen unlocked. For example, the mobile phone receives, in the screen off state, an operation of pressing a power-on button performed by the user. The mobile phone performs unlocking through a human face and displays a desktop. At this time, the display screen is in the screen on state. For example, the mobile phone receives, in the screen off state, the operation of pressing the power-on button performed by the user. When the mobile phone fails in unlocking through the human face, a screen locked interface is displayed. At this time, the display screen is in the screen on state. For example, in the screen locked mode (with the display screen on), if no user operation is received within a specified time period (such as 20 s, which may be set according to actual requirements and is not limited in this application), the screen locked interface changes to the half screen off state, and if no user operation is received within 3 s (which may be set according to actual requirements and is not limited in this application), the screen locked interface enters the screen off mode, that is, the display screen is off.

Still referring to FIG. 7, for example, the awareness service may obtain the state of the display screen through the display drive, to determine whether the state of the display screen is on. In an example, if the screen is currently in the screen on state, S702 is performed. In another example, if the display screen is currently in the screen off state or the half screen off state, it is determined that the detection condition is not satisfied, and the current determination process ends. In another embodiment, if the display screen is currently in the screen on state or the half screen off state, that is, in a non-screen off state, S702 may be performed.

Optionally, in this embodiment of this application, the awareness service may trigger the display drive to report the state of the display screen in real-time after startup. For example, the awareness service can may transmit indication information to the display drive, to indicate that the display drive should report the state of the display screen to the awareness service.

S802: The awareness service determines whether an optical proximity sensor is blocked.

For example, referring to FIG. 7, the awareness service may transmit indication information to the sensor drive to indicate that the sensor drive should obtain a state of the optical proximity sensor and then report the state to the awareness service after detecting that the optical proximity sensor is blocked.

For example, if the user places the mobile phone on a table top with a front facing the table top or puts the mobile phone in a pocket, the optical proximity sensor is blocked. After it is detected that the optical proximity sensor is blocked, a detection signal is transmitted to the sensor drive. The sensor drive may determine that the optical proximity sensor is blocked based on the received detection signal, that is, an optical proximity sensor block event occurs. The sensor drive may output the optical proximity sensor block event to the awareness service. The awareness service determines that the optical proximity sensor is blocked in response to the received optical proximity sensor block event.

For example, if the optical proximity sensor is not blocked, optionally, the optical proximity sensor may not output a detection signal. That is to say, the sensor drive determines that no optical proximity block event occurs when receiving no detection signal transmitted by the optical proximity sensor.

In an example, if the awareness service detects that the optical proximity sensor is blocked, the current determination process ends. It should be noted that an "end" step shown in FIG. 8 may optionally be that the awareness service ends the determination process when determining that a specific condition is not satisfied. After the current process ends, the awareness service re-performs S801, which is not repeated in the following.

In another example, if the awareness service detects that the optical proximity sensor is not blocked, S803 is performed.

S803: The awareness service determines whether an incoming call exists.

For example, referring to FIG. 7, after the awareness service starts up in response to an indication received from a ringtone retrieval application, the awareness service may transmit indication information to a call management service to indicate that the call management service should obtain a state of a modem. For example, the call management service may obtain the state of the modem through a modem drive.

In an example, if the modem receives an incoming call, the modem outputs an incoming call indication to the modem drive. The modem drive outputs an incoming call event to the call management service. The call management service outputs the incoming call event to the awareness service. The awareness service may determine that an incoming call from another user exists in response to the received call event. It should be noted that as described above, the embodiments of this application are also applicable to an incoming network call scenario. For example, another application may initiate a video chat to a user of a local device through a chat application, and the local device receives a network call request, also referred to as an incoming network call, through an antenna and a Wi-Fi module (or a mobile communication module) in a wireless communication module. The Wi-Fi module may report the network call request to an upper layer through a Wi-Fi drive. The Wi-Fi drive determines that an incoming network call event exists in response to the received network call request. The Wi-Fi drive may output the incoming network call event to the chat application, and the chat application plays a network call ringtone (the ringtone may be the same or different from an incoming call ringtone of an operator, which is not limited in this application) through a speaker of the mobile phone. For example, the Wi-Fi drive may optionally transmit the incoming network call event to the awareness service. The awareness service determines that an incoming call exists in response to the received incoming network call event.

For example, in this embodiment of this application, the awareness service performs S804 after determining that an incoming call exists (which may be an incoming call from the operator or an incoming network call).

S804: The awareness service determines whether a ringing function is enabled.

For example, as described above, the user may enable the ringing function (or may be referred to as a ringing service, a ringing mode, or the like) by tapping the ringing option 3021. The awareness service may obtain a state of the ringing function (including enabled and disabled).

In an example, if the awareness service detects that the ringing service has started (including a ringing mode or a ringing and vibration mode), a subsequent detection process is performed. In another example, if the awareness service detects that the ringing service is not started, for example, if the mobile phone is currently in the vibration mode or the mute mode, the current detection process ends.

It should be noted that in this embodiment of this application, description is provided in the order of S801 to S804. In other embodiments, S801 to S804 may be performed simultaneously or in another order, which is not limited in this application.

For example, if another user initiates an operator voice callin to the mobile phone, the modem of the mobile phone outputs an incoming call indication to the modem drive in response to the received incoming call request (also referred to as a voice callin request, a voice call request, or the like). The modem drive outputs an incoming call event to the call management service in response to the received incoming call indication. The call management service outputs the incoming call event to the awareness service. The awareness service may determine that an incoming call exists in response to the received call event. Next, the awareness service may simultaneously perform the determination process including S804, S802, and S801. When the condition in any one of S804, S802, and S801 is not satisfied, the current process ends. For example, if the awareness service detects that the optical proximity sensor is blocked, the awareness service ends the current determination process.

Optionally, the awareness services may alternatively record a current state of each determination condition in real time, to perform the subsequent detection process when all determination conditions are satisfied. For example, when the awareness service does not receive the block event inputted by the sensor drive, the awareness service may determine that S802 is always satisfied, that is, the optical proximity sensor is not blocked. Therefore, when the awareness service determines that currently an incoming call exists through the modem drive, the awareness service does not need to perform the determination process of S802. In other words, the awareness module may determine that the optical proximity sensor is not blocked. For example, it is assumed that the awareness module obtains that the display screen is currently in a screen on state through the display drive, for example, the sound and vibration display interface 301 is displayed. The awareness service may record that the display is currently in the screen on state, that is, the condition in S801 is satisfied. If the user selects the vibration option 3022, the awareness service may determine that the mobile phone does not enable the ringing function in response to the received operation performed by the user. Correspondingly, the current process ends, and the awareness service does not need to perform the detection process shown in FIG. 8 before the mobile phone enables the ringing function. It may be understood that the awareness service does not need to repeat the determination processes in S801 to S804, but instead, determine the state of each determination condition through real-time acquisition of events inputted by the drives or services.

S806: The awareness service starts a detection.

For example, still referring to FIG. 7, the awareness service determines that each condition in S801 to S804 is satisfied. That is to say, when the mobile phone is currently in the screen on state, the optical proximity sensor is not blocked, currently an incoming call exists, and the mobile phone has enabled the ringing function, the awareness service determines that the detection conditions are satisfied. The awareness service outputs indication information to the ringtone volume reduction application to indicate that all of the detection conditions are satisfied. The ringtone volume reduction application instructs, in response to the indication information received from the awareness service, the awareness service to perform the ringtone volume reduced upon gazing at screen detection.

It should be noted that different detection types may correspond to the same detection condition or different detection conditions. For example, if the user selects to include the ringtone volume reduced upon gazing at screen option, the ringtone volume reduction application transmits indication information to the awareness service, to indicate that the awareness service should enable the incoming call volume reduced upon gazing at screen detection, that is, perform a detection on a condition corresponding to the incoming call volume reduced upon gazing at screen. Optionally, if the user selects the incoming call volume reduced upon detection of voice option, the ringtone volume reduction application transmits indication information to the awareness service, to indicate that the awareness service should start the incoming call volume reduced based on voice detection, that is, perform a detection based on a condition corresponding to the incoming call volume reduced based on voice detection.

S806: The awareness service determines whether a ringtone volume reduction condition is satisfied.

Figure 10:
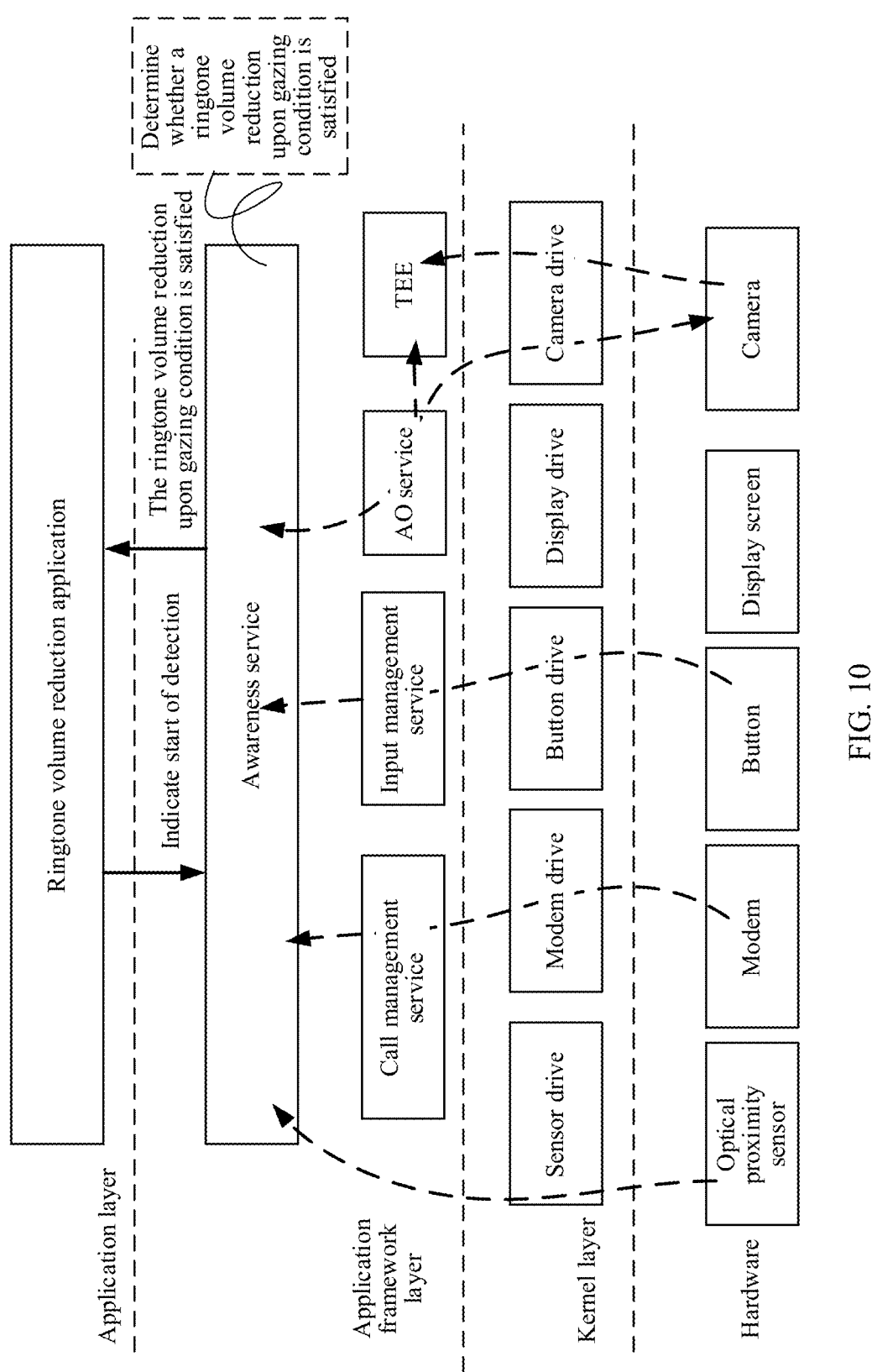
FIG. 10 is an example schematic diagram of module interaction.

For example, referring to FIG. 10, the ringtone volume reduction application instructs, in response to the indication information received from the awareness service, the awareness service to perform a ringtone volume reduction detection. The awareness service performs a detection based on a set ringtone volume reduction condition. As described above, different ringtone volume reduction detection types correspond to different conditions. In this embodiment of this application, the incoming call volume reduced upon gazing at screen solution is used as an example for description.

Figure 9:
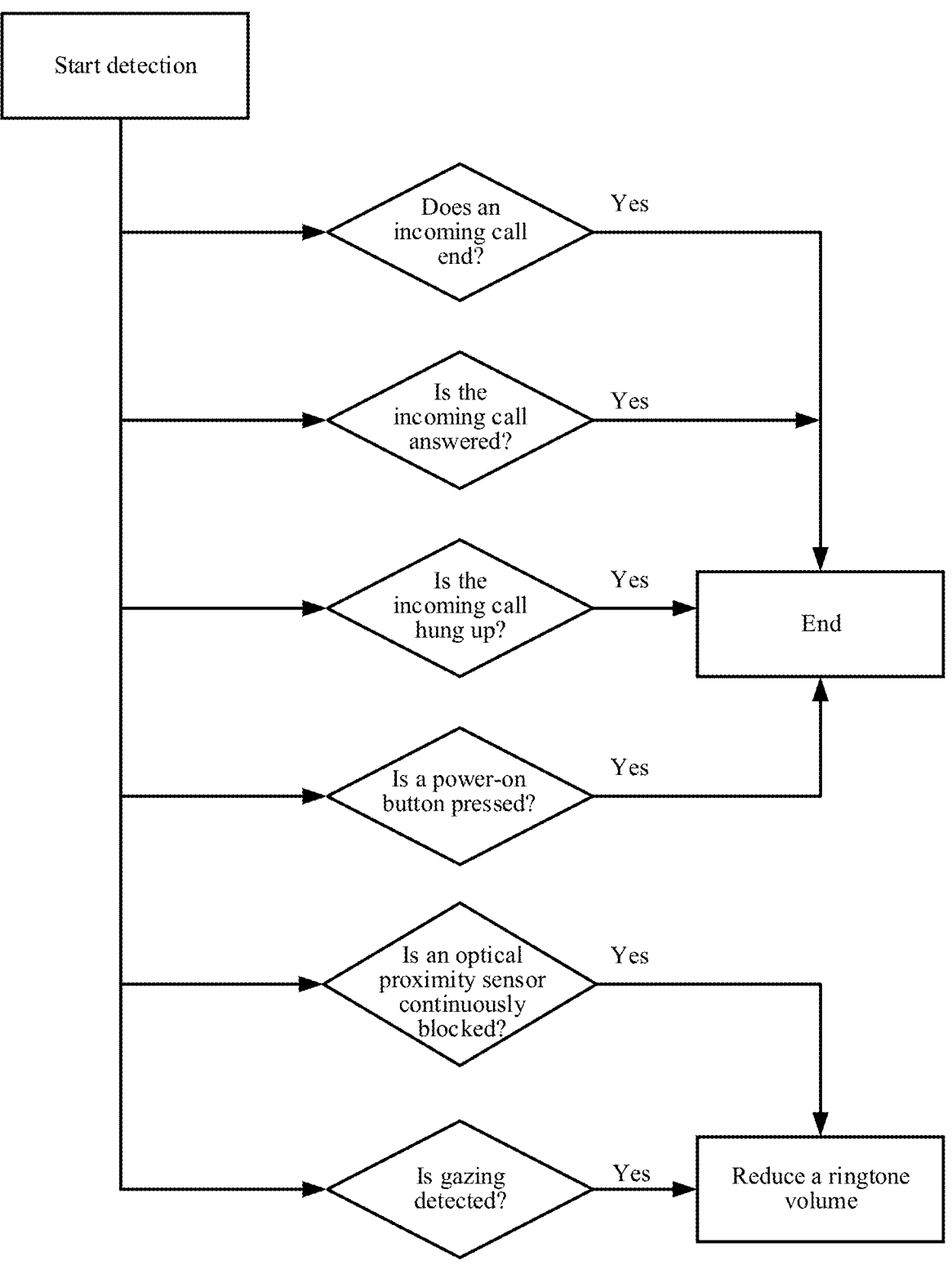
FIG. 9 is an example schematic flowchart of ringtone volume reduction.

For example, referring to FIG. 9, an incoming call volume reduced upon gazing at screen condition includes but is not limited to at least one of the following:

1) the incoming call does not end during the detection;
2) the incoming call is not answered during the detection;
3) the incoming call is not hung up during the detection;
4) pressing on the power-up button is not detected during the detection;
5) the optical proximity sensor is blocked during the detection; and
6) gazing is detected during the detection.

It should be noted that in this embodiment of this application, only the foregoing conditions are used as examples for description. In other embodiments, more or fewer conditions may be included. This is not limited in this application.

It should be further noted that, the awareness service may be configured with a detection duration. Specific examples are detailed in the following embodiments.

For example, in this embodiment of this application, the awareness service performs a detection based on the foregoing conditions. If any one of the conditions 1) to 4) is not satisfied, the current detection process ends, and S801 is repeated. In an example, during the detection, if the awareness service determines, in response to a received operation of tapping the hang up option by the user, that the incoming call is hung up, the current detection process ends. In another example, during the detection, if the awareness service detects that the incoming call ends, that is, a peer end stops the call or the call reaches a maximum duration, the current detection process ends. In still another example, during the detection, if the awareness service determines, in response to a received operation of tapping the answer option by the user, that the incoming call is answered, the current detection process ends. In yet another example, during the detection, the awareness service determines, in response to a received operation of pressing the power-on button (or a volume button) performed by the user, that the incoming call is muted, the current detection process ends. It should be noted that in this embodiment of this application, only that the user taps the hang up option or the answer option to hang up or answer the call is used as an example for description. In other embodiments, the user may hang up or answer the incoming call through a display interface of a watch communicatively connected to the mobile phone. For example, when the mobile phone receives an incoming call, the watch and the mobile phone of the user display an incoming call interface synchronously, and the user taps the answer option on the watch. Correspondingly, the watch outputs an obtained user operation to the mobile phone. Correspondingly, the awareness service in the mobile phone may determine whether the incoming call is answered or hung up based on a received indication signal. Certainly, in other embodiments, the user may answer or hang up the incoming call in another manner, for example, may control a speaker connected to the mobile phone. A module monitored by the awareness service varies in a different manner. Examples are not enumerated herein.

For example, in this embodiment of this application, when all of the conditions 1) to 4) are satisfied, that is, when the incoming call is not answered, the incoming call does not end, the incoming call is not hung up, and the incoming call is not muted, the awareness service may determine whether the incoming call volume needs to be reduced based on a block state of the optical proximity sensor and gazing detection result. For example, when all of the conditions 1) to 4) are satisfied, if the awareness service detects that the optical proximity sensor is continuously blocked or detects user gazing, the awareness service controls the incoming call volume to decrease. For example, when all of the conditions 1) to 4) are satisfied, if the awareness service neither detects that the optical proximity sensor is continuously blocked nor detects user gazing, the awareness service may perform a next detection cycle or ends the current detection process. Specific details are described in the following embodiments.

It should be noted that in this embodiment of this application, as shown in FIG. 3, the user may set the incoming call volume by adjusting the volume option 3041. Optionally, in this embodiment of this application, a first incoming call volume threshold may be set. For example, in S804, during determination whether the ringing function is enabled, it may be further determined whether the set incoming call volume exceeds the first threshold. If the set incoming call volume does not exceed the first threshold, which may be understood as that the incoming call volume is relatively small, the subsequent detection process may be omitted.

In a possible implementation, the expression "reduce the incoming call volume" in this application may optionally be reducing the incoming call volume (such as a first volume) to a second volume. For example, as described above, if the mobile phone is configured with the first threshold set, the second volume is less than the first threshold.

In another possible implementation, the expression "reduce the incoming call volume" in this application may optionally be reducing the incoming call volume by a set volume value. For example, the set volume value in the mobile phone is 20 decibels. When the awareness service determines that the ringtone volume needs to be reduced, the current volume may be reduced by 20 decibels. It should be noted that an incoming call volume set in the mobile phone needs to be greater than the set volume value, that is, greater than 20 decibels. The value may be understood as the foregoing first threshold.

In still another possible implementation, the expression "reduce the incoming call volume" in this application may optionally be reducing the incoming call volume to 0 decibels, that is, controlling the incoming call to mute.

For example, as described above, different detection manners correspond to different detection conditions. In this embodiment of this application, an incoming call volume reduced based on voice manner is further provided. A detection condition corresponding to the detection method includes but is not limited to at least one of the following:

1) the incoming call does not end during the detection;

2) the incoming call is not answered during the detection;

3) the incoming call is not hung up during the detection;

4) pressing on the power-up button is not detected during the detection;

5) the optical proximity sensor is blocked during the detection; and 6) a specified voice is detected during the detection.

For example, for descriptions of the conditions 1) to 5), refer to the above, which are not repeated herein. Optionally, the specified voice may be a voice command with a specified content. For example, if the user says "reduce the ringtone volume" to the mobile phone, the awareness service may obtain a voice from a surrounding environment through the microphone and determine that the voice includes the specified voice command, that is, "reduce the ringtone volume". In this case, the awareness service may reduce the incoming call volume.

The incoming call volume reduced upon gazing at screen condition detection is used as example for description below. With reference to FIG. 9, FIG. 10 is an example schematic diagram of module interaction. Referring to FIG. 10, for example, in response to the indication of the ringtone volume reduction application, the awareness service starts the incoming call volume reduced upon gazing at screen condition detection, which may also be referred to as a ringtone volume reduced upon gazing at screen condition detection. The awareness services may obtain the state of the optical proximity sensor (including a blocked state and a non-blocked state) through the sensor drive. For specific descriptions, refer to the above, which are not repeated herein.

For example, the awareness service may obtain the incoming call state through the call management service, which includes, for example, Whether the incoming call ends, whether the incoming call is answered, and whether the incoming call is hung up.

For example, the awareness service may further collect the state of the power-on button from a button drive through an input management service. For example, whether the user presses the power-on button (or the volume button, which is not limited in this application) may be obtained.

For example, during the detection, the awareness service obtains a state of each module or device in real time. When all of the conditions 1) to 4) are satisfied, and it is detected that temporarily the optical proximity sensor is not blocked, the awareness service performs a gazing detection. It should be noted that the detections for the conditions 1) to 6) are performed in real time or simultaneously, and the specific principle is similar to that in FIG. 8. For example, during the detection, the awareness service may consider that the condition 4) is satisfied before receiving a power-on button pressing event inputted by the input management service.

For example, referring to FIG. 10, in response to the indication of the ringtone volume reduction application, the awareness service starts the incoming call volume reduced upon gazing at screen detection. The awareness service instructs the AO service to perform the gazing detection. In response to the indication of the awareness service, the AO service instructs the camera drive to enable the camera and output images captured by the camera to the TEE. In response to the indication of the AO service, the camera drive obtains the images captured by the camera and outputs the captured images to the TEE.

Figures 11, 12:
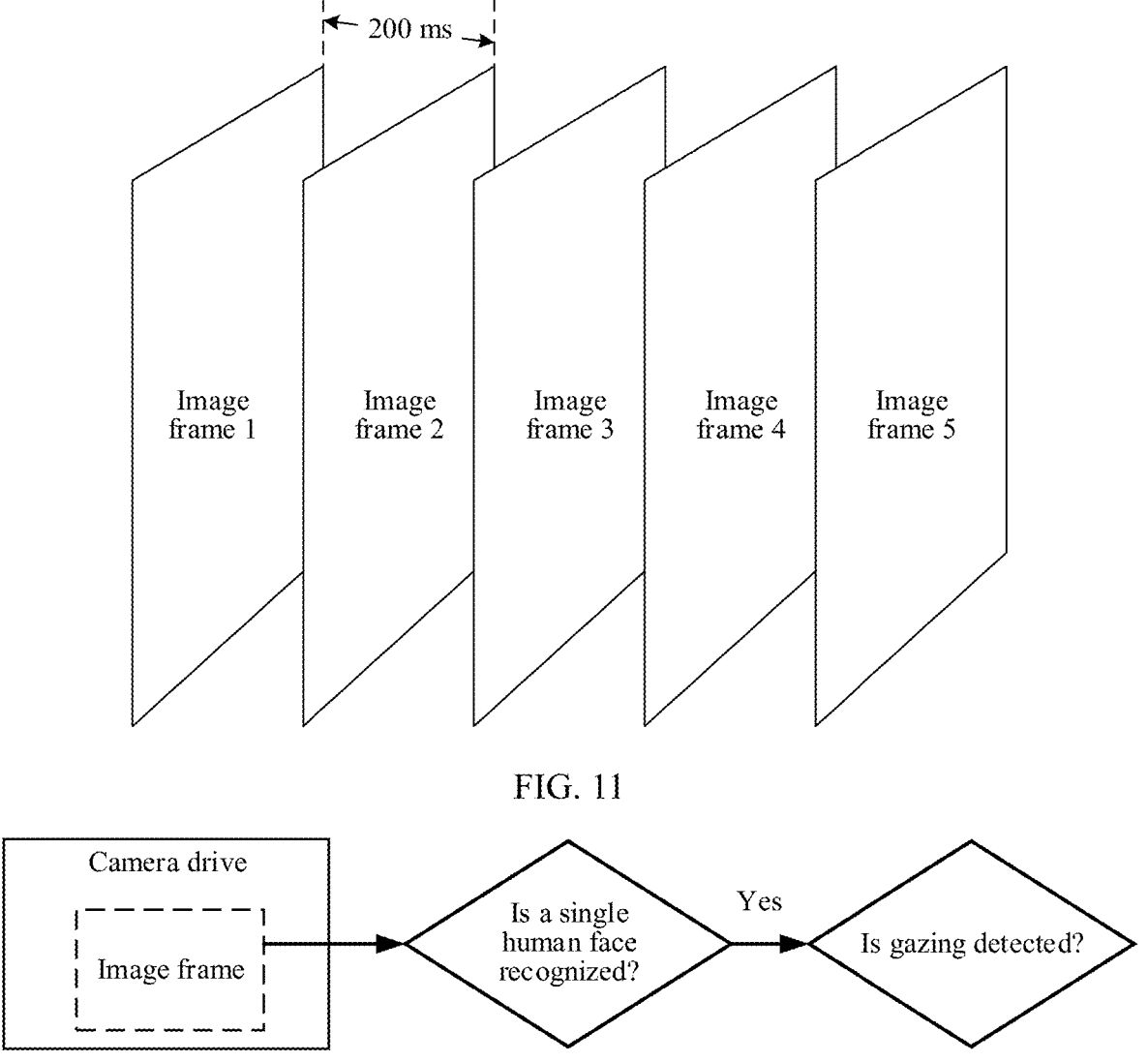
FIG. 11 is an example schematic diagram of image frame acquisition.
FIG. 12 is an example schematic flowchart of recognition.

Referring to FIG. 11, for example, the camera drive may output image frames to TEE at a frame rate of 5 fps (that is, a number of image frames captured per second), thereby reducing TEE usage while ensuring time relevancy. 5 fps may optionally mean that the camera outputs 5 image frames to TEE per second. The value is merely an illustrative example and is not limited in this application.

In another possible implementation, the frame rate of the camera is optionally 60 fps, which means that the number of image frames captured per second is optionally 60. The camera drive may obtain an image frame from the camera every 200 ms and output the image frame to the TEE for 11 s (that is, a detection duration). Optionally, in other embodiments, the camera drive may control the capture frame rate of the camera. For example, the camera may capture images based on a frame rate of 5 fps, that is, capture one image frame every 200 ms and output the image frame to the camera drive. It should be noted that the value of the frame rate is merely an illustrative example and is not limited in this application.

Still referring to FIG. 10, for example, the TEE obtains, from the camera drive, the image frames captured by the camera. For example, the TEE may obtain 5 image frames from the camera drive every 1 second. The AO service may recognize the images in the TEE based on a preset detection algorithm (also referred to as a recognition algorithm).

FIG. 12 is an example schematic flowchart of recognition. Referring to FIG. 12, for example, the camera drive outputs the image frames to the TEE. The AO service performs recognition on the image frames in the TEE based on a human face detection algorithm to detect whether each of the image frame includes a single human face. Optionally, if the image frame does not include a human face or includes a plurality of human faces, the AO service determines that the recognition of the image frame fails and then processes a next image frame. Optionally, in this embodiment of this application, the AO service deletes an image frame from the TEE after completing the recognition of the image frame. Optionally, the AO service may delete 5 (or another number, which is not limited in this application) image frames each time the recognition for the 5 image frames is completed, thereby reducing the TEE usage and further improving security of user privacy.

For example, if the AO service detects that the image frame includes a single human face, the AO service recognizes whether a human eye in the single human face is gazing by using a gazing detection algorithm. For example, it is assumed that the user is facing the mobile phone but the user is gazing at another position instead of the mobile phone. Correspondingly, the image collected by the camera includes the face of the user, and the AO service recognizes a single human face based on the face detection algorithm. However, during the gazing detection, the AO service recognizes that the user is not gazing at the mobile phone. Therefore, the AO service determines that the current recognition fails and then processes the next image frame. For example, if the user is facing the mobile phone and is gazing at the display screen, correspondingly, the image collected by the camera includes the face of the user, and the AO service recognizes a single human face based on the face detection algorithm. In addition, during the gazing detection, the AO service recognizes that the user is gazing at the mobile phone. Therefore, the AO service determines that the gazing recognition succeeds. The AO service may transmit indication information to the awareness service to indicate that the user gazing is detected. It should be noted that for specific details of the algorithm, refer to the related art, and the details are not described in this application.

Still referring to FIG. 10, for example, when the awareness service determines that the gazing detection succeeds and all of the foregoing conditions 1) to 4) are satisfied, the awareness service determines that the ringtone volume (or the incoming call volume) reduced upon gazing at screen condition is satisfied. The awareness service transmits indication information to the ringtone volume reduction application to indicate that the ringtone volume reduced upon gazing at screen condition is satisfied.

Figure 13:
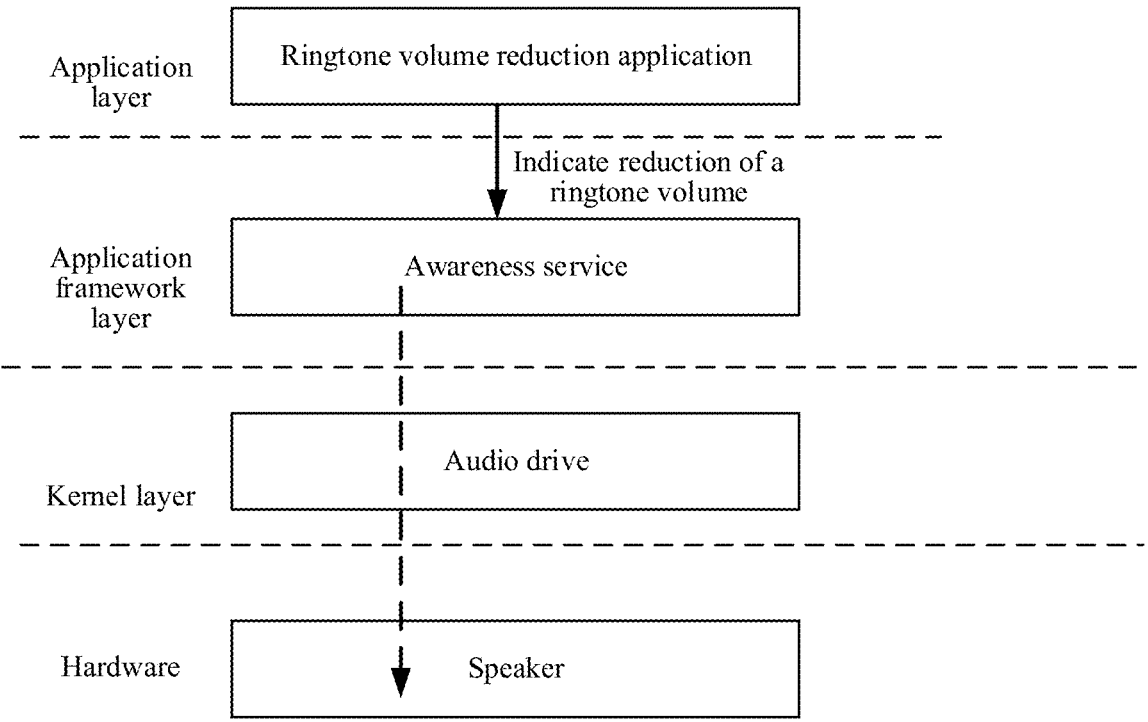
FIG. 13 is an example schematic diagram of module interaction.

Referring to FIG. 13, for example, the ringtone volume reduction application determines, in response to the indication information received from the awareness service, that the ringtone volume reduced upon gazing condition is satisfied. The ringtone volume reduction application transmits indication information to the awareness service, to indicate that the awareness service should reduce the incoming call volume. The awareness service controls, in response to the indication of the ringtone volume reduction application, the speaker to reduce the volume through the audio drive. For example, in this embodiment of this application, the awareness service controls the speaker to reduce the incoming call volume to a specified volume value (such as 20 decibels, which may be set according to actual needs, and is not limited in this application). It should be noted that in this embodiment of this application, the reduction of the incoming call volume takes effect only for the current adjustment. That is to say, the current incoming call volume adjustment will does not affect a volume of another application or a volume of a next incoming call. For example, the volume of the next incoming call is still the volume value set by the user. This is not repeated in the following text.

Optionally, after the current detection ends, the awareness service repeats S701 after the current incoming call ends. For example, during the current detection, if the awareness service detects that the user presses the power-on button, the current detection ends. The awareness service repeats S701 after the incoming call ends. The above may be understood as repeating the foregoing steps when a next incoming call is received.

Figure 14A:
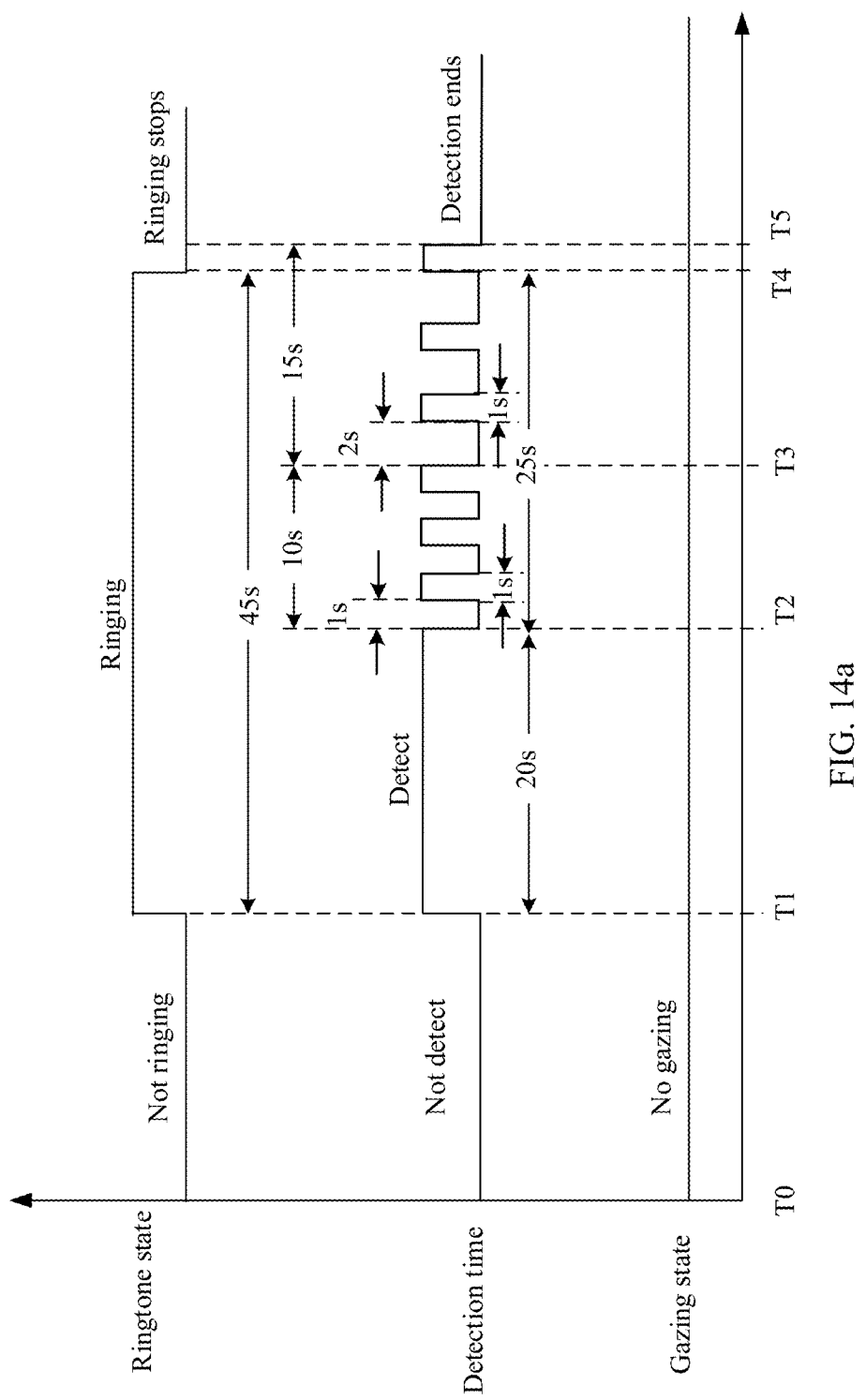
FIG. 14a-FIG. 14e are example schematic flowcharts of ringtone volume reduced upon gazing detection.

The ringtone volume reduction solution in this embodiment of this application is described in detail below with reference to specific examples. For example, that the user enables the incoming call volume reduced upon gazing at screen function (for relevant description, refer to FIG. 6, which is not repeated herein) is still used as an example for description. FIG. 14a is an example schematic diagram of ringtone volume reduced upon gazing detection. Referring to FIG. 14a, for example, if the mobile phone does not receive an incoming call at moments T0 to T1, and correspondingly, the ringtone state is not ringing. At the moments T0 to T1, the awareness service obtains a block state (including a blocked state and a non-blocked state) of the optical proximity sensor, an incoming call reception state of the modem, and an enable state of the ringing function in real time in response to the indication of the ringtone volume reduction application. That is to say, the awareness service performs the detection condition determination in S801 to S804. In this example, at the moments TO to T1, the awareness service detects that the mobile phone is in the screen on state, the optical proximity sensor is not blocked, and the ringing function is enabled. That is to say, the conditions in S801, S802, and S804 are all satisfied. It should be noted that the time points (such as the moment TO and the moment T1) and durations (such as the duration of the detection window) in this embodiment of this application are merely illustrative examples and may be set according to actual needs, which are not limited in this application.

For example, at the moment T1, the modem receives a callin from the operator, that is, an incoming call from the operator. The modem reports the incoming call to the awareness service through the modem drive and the call management service. When the awareness service detects an incoming call from a user and determines that all of the conditions in S801, S802, and S804 are satisfied, the awareness service determines that the detection condition is satisfied. The awareness service transmits indication information to the ringtone volume reduction application to indicate that the detection condition is satisfied. The ringtone volume reduction application transmits indication information to the awareness service in response to the indication of the awareness service, to indicate that the awareness service should perform the ringtone volume reduced upon gazing at screen detection.

For example, starting from the moment T1, the mobile phone receives an incoming call and starts ringing. A volume of the ringing is the volume set by the user, such as the first volume. In this embodiment, for example, a duration of the ringing is 45 s. That is to say, if the user calls for 45 s and the incoming call is not answered or hung up, the current incoming call will be automatically hung up.

For example, referring to FIG. 14a, at the moment T1, the awareness service starts the detection in response to the indication of the ringtone volume reduction application. The above may also be understood as that the awareness service starts one or more detection cycles, with a plurality of detection windows enabled within each cycle. Whether the ringtone volume reduced upon gazing condition is satisfied is detected in each of the detection windows. In FIG. 14a, one detection cycle is started, for example. For example, one detection cycle includes a fast detection cycle and a slow detection cycle. For example, the moments T1 to T2 form the fast detection cycle. In this cycle, the awareness service opens a detection window, and a duration of the detection window is a duration of the cycle. For example, if the duration of the fast detection cycle is 20 s, the duration of the detection window is 20 s. For example, one or more windows may be opened in the slow detection cycle. For example, in FIG. 14a, the slow detection cycle includes moments T2 to T4, and a duration of the slow detection cycle is 25 s. It should be noted that the settings of the durations in this embodiment of this application are merely illustrative examples. For example, the duration of the fast detection cycle may be 25 s, and the duration of the slow detection cycle may be 20 s, which may be set according to actual needs. This is not limited in this application. It should be further noted that, the number of windows in each slow detection cycle in this embodiment of this application is merely an illustrative example, and actually, more or fewer detection windows may be arranged. This is not limited in this application.

Still referring to FIG. 14a, for example, the awareness service opens one or more windows in the slow detection cycle. The windows may be opened as follows: in the first 10 s of the slow detection cycle, for example, at the moments T2 to T3, the awareness service opens one detection window every is, that is, intervals between the detection windows are 1 s. A duration of the detection window is 1 s. At moments T3 to T5, that is, in a duration of 15 s, the awareness service increases the intervals between the detection windows. For example, the intervals between the detection windows are 2 s. It should be noted that the increase of the intervals in FIG. 14a is merely an illustrative example. For example, in other embodiments, in the duration of 15 s, the awareness service may gradually increase the intervals. For example, in the first 5 s of the 15 s, the intervals between the detection windows are 2 s, and from the $10^{th}$ second, the intervals between the detection windows are 3 seconds. This is not limited in this application.

The detection window in the fast detection cycle between T1 and T2 is used as an example. After the awareness service opens the detection window, the awareness service detects whether the ringtone volume reduced upon gazing at screen condition is satisfied in the detection window (also referred to as a detection duration), that is, performs the process in FIG. 8 to FIG. 9. In this embodiment, for example, the user never gazes at the screen, that is to say, the awareness service does not detect the user gazing in the detection window from the moments T1 to T2. In addition, the awareness service does not detect that the incoming call is hung up, the user presses the power-on button, the incoming call is answered, the optical proximity sensor is blocked, or the incoming call ends. At the moment T2, the awareness service closes the detection window, that is, ends the fast detection cycle and enters the slow detection cycle. For example, after 1 s since closing of the detection window, the awareness service re-opens the detection window. The duration of the detection window is 1 s. In the detection window, the awareness service continues the detection based on the process in FIG. 8 to FIG. 9. For specific description, refer to the above, which is not repeated herein. For example, the awareness service still neither detects the user gazing nor detects conditions such as hang up of the incoming call. The awareness service closes the window, and re-opens the detection window with the duration of 1 s after 1 s. For specific steps, refer to the above, which are not repeated herein. At the moment T3, the awareness service still neither detects the user gazing nor detects another condition (including the incoming call ending and the like). The awareness service increases the intervals between the detection windows to further reduce power consumption. For example, from the moment T3, every 2 s, the awareness service opens a detection window with a duration of 1 s. For specific descriptions, refer to the above, which are not repeated herein. The above may be understood as that the awareness service does not perform gazing at screen detection in the interval between two detection windows. For example, at the moment T2, the detection window is closed, and the awareness service may notify the AO service that the detection may be paused. The AO service may not detect the image frames in the TEE in the interval of 1 s. That is to say, in the interval of 1 s, the camera is still capturing images and outputting the images to the TEE. However, in the interval of 1 s, the AO does not process the images in the TEE, thereby reducing algorithm consumption. After the interval expires, that is, when a next detection window is opened, the AO service deletes 5 image frames stored in the TEE during the interval of 1 s. Optionally, the AO service may instruct, through the camera drive, the camera not to capture images in the interval of 1 s, and to continue the image capture when the next detection window is opened, thereby further reducing power consumption and overheads for module interaction. It should be noted that a delay in the process of interaction between the modules in this embodiment of this application is relatively short and may be ignored.

Still referring to FIG. 14a, for example, in the detection window opened at the moment T4, when the incoming call reaches a maximum call duration, that is, 45 s, the incoming call ends (the operator ends the incoming call, the other user hangs up the incoming call, or the mobile phone automatically hangs up the incoming call after the incoming call duration is reached). The awareness service detects that the incoming call ends, and determines that the current detection ends. The awareness service stops the detection and repeats S801. It should be noted that in FIG. 14a, the detection window at the moment T4 (that is, a rising edge of the detection window) coincides with a ringing stop moment, for example. In other embodiments, the rising edge of the detection window may be either before or after the ending of the incoming call. For example, if the awareness service does not open the detection window at the end of the of call, the awareness service will stop the detection when detecting the ending of the incoming call in the next detection window opened after the ending of the call. Optionally, in other embodiments, during the interval, the awareness service does not perform user gazing detection, but may continuously monitor an incoming call situation. That is to say, if the awareness service can detect the ending of the incoming call during the interval, the next detection window does not need to be opened.

Figure 14B:
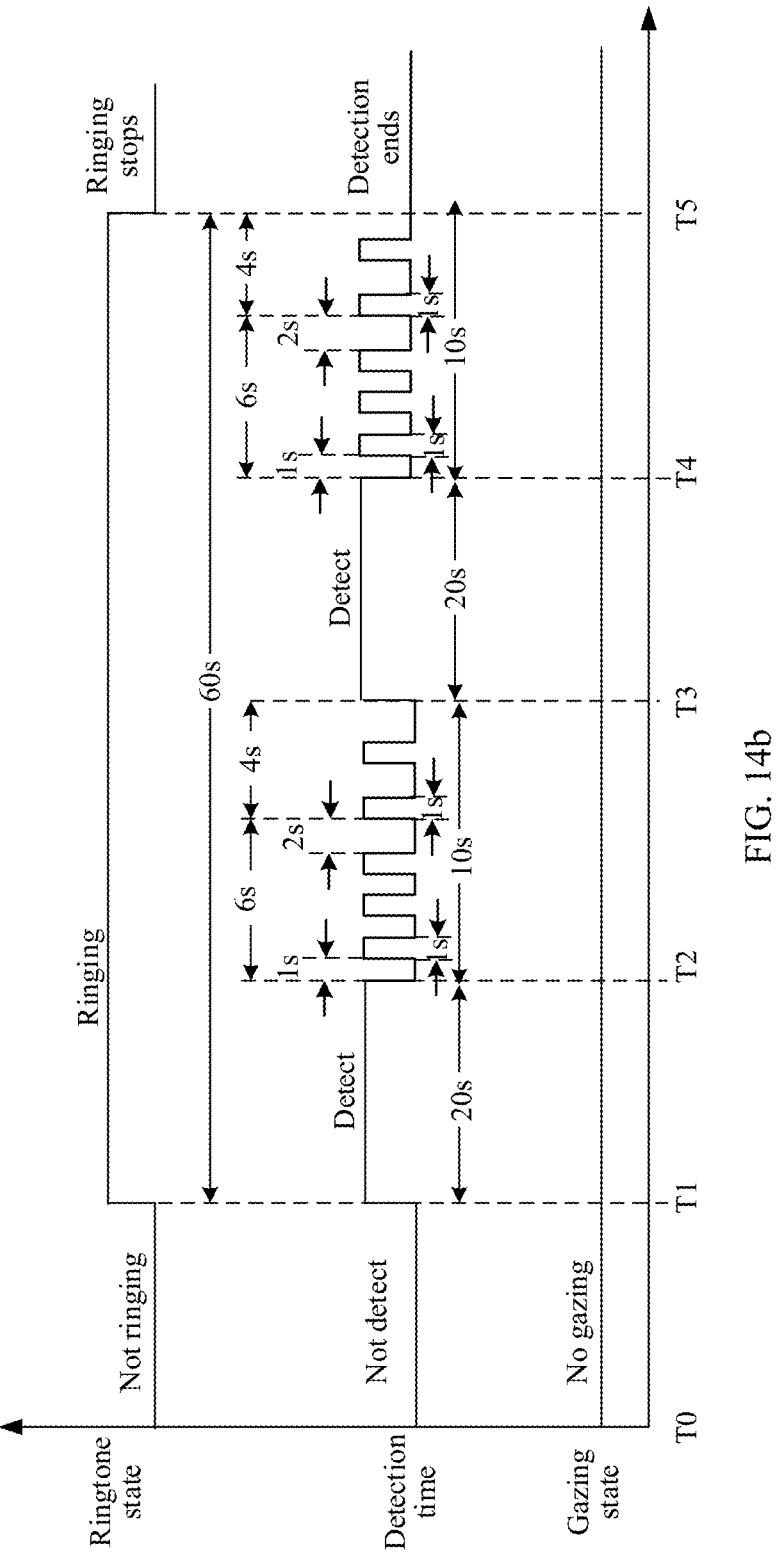

FIG. 14b is an example schematic diagram of ringtone volume reduced upon gazing detection. Referring to FIG. 14b, for example, ad described above, the awareness service may start one or more detection cycles. For example, if a maximum ringing duration is 60 s, in a case that the incoming call is not answered or hung up within 60 s, the incoming call will automatically end. For example, the moments T1 to T3 form a detection cycle, and moments T3 to T5 form a detection cycle. At the moment T1, the awareness service detects an incoming call from a user, and starts a fast detection cycle in a first detection cycle and opens a detection window. A duration of the detection window is 20 s. For example, at the moment T2, the awareness service ends the fast detection cycle ends and enters a slow detection cycle. The awareness service starts a slow detection process, that is, reduces the power consumption by increasing the intervals between the detection windows. For example, a duration of the slow detection cycle is 10 s. The intervals between the detection windows in the first 6 s are 1s, and the intervals between the detection windows in the last 4 s are 2 s. For specific descriptions, refer to FIG. 14a, which are not repeated herein.

Still referring to FIG. 14b, for example, at the end of the current detection cycle, that is, at the moment T3, the awareness service detects the user gazing and another condition. The awareness service starts a new detection cycle, that is, a second detection cycle (for example, T3 to T5), to continue the ringtone volume reduced upon gazing of user at screen detection. For specific descriptions, refer to the description of the first detection cycle, which are not repeated herein. For example, in a slow detection cycle of the second detection cycle, if the awareness service detects the ending of the incoming call, the awareness service ends the second detection cycle and repeats S801. It should be noted that in FIG. 14b, only two detection cycles are shown. In other embodiments, a plurality of detection cycles may be arranged. For example, a duration of each detection cycle may be 20 s, and during the ringing of 60 s, 3 detection cycles may be started. This is not limited in this application.

Figure 14C:
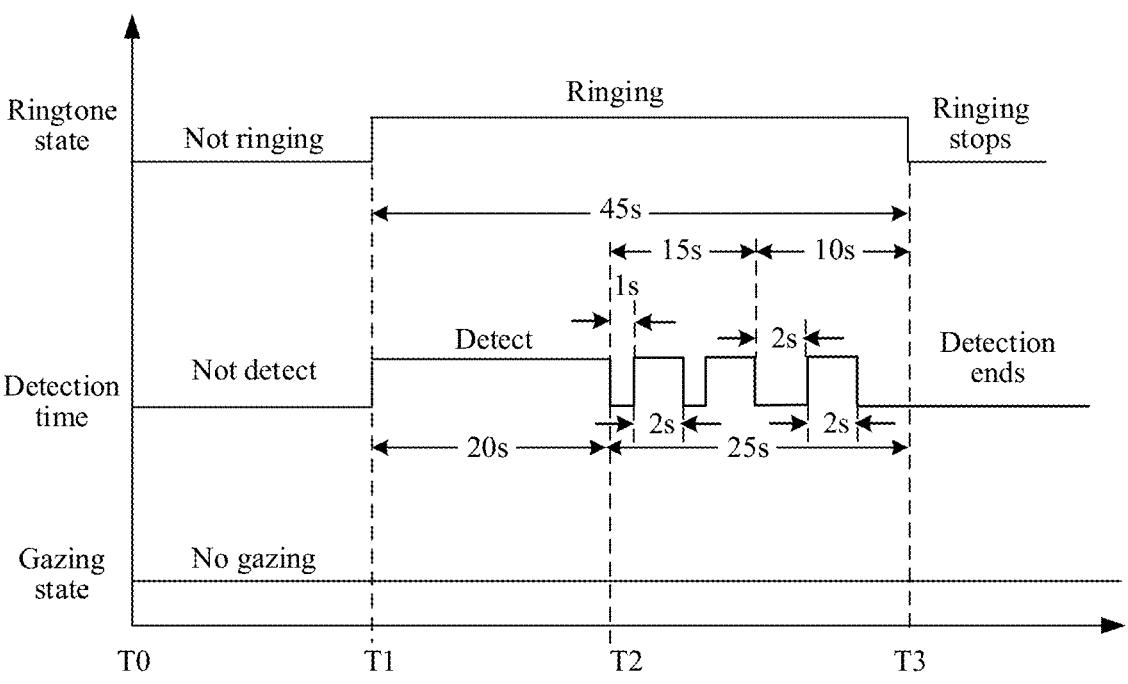

FIG. 14c is an example schematic diagram of ringtone volume reduced upon gazing detection. Referring to FIG. 14c, for example, as described above, the duration of the detection window in the slow detection cycle may be either is or 2 s. For example, in FIG. 14c, the duration of each detection window opened by the awareness service in the slow detection cycle is 2 s, with an interval being increased from 1 s to 2 s. It may be understood that during setting of the durations and the intervals of the detection windows in the slow detection cycle, conditions including but not limited to time relevancy and power consumption need to be considered. It may be understood that if the interval is excessively long, the user gazing may not be undetected after gazing of the user, affecting real-time relevancy of the detection. However, continuous detection affects system power consumption. Therefore, the intervals and the durations of the detection windows need to be set in combination with real-time relevancy and power consumption. For example, if a current battery power is less than a threshold (for example, less than 50%), the awareness service may tend to set the detection durations and intervals in consideration of power consumption reduction. That is to say, in this embodiment of this application, the awareness service may dynamically adjust the durations and the intervals of the detection windows in the slow detection cycle based on conditions such as a remaining battery power. For example, at 8 a.m., if the awareness service detects that the battery power is 80%, the awareness service may open the detection window based on the slow detection cycle in FIG. 14c. At 4 p.m., if the awareness service detects that the battery power is 30%, the awareness service may open the detection window based on the slow detection cycle shown in FIG. 14a. In other words, when the battery power is low, the awareness service may shorten the duration of the detection window to reduce power consumption. At 6 p.m., if the awareness service detects that the battery level is 10%, or if the awareness service detects that the mobile phone is in a low power mode (which may be manually enabled by the user), the awareness service may not perform the gazing detection process to reduce power consumption of detection. For descriptions of other parts in FIG. 14c, refer to the relevant content in FIG. 14a, which are not repeated herein.

Figure 14D:
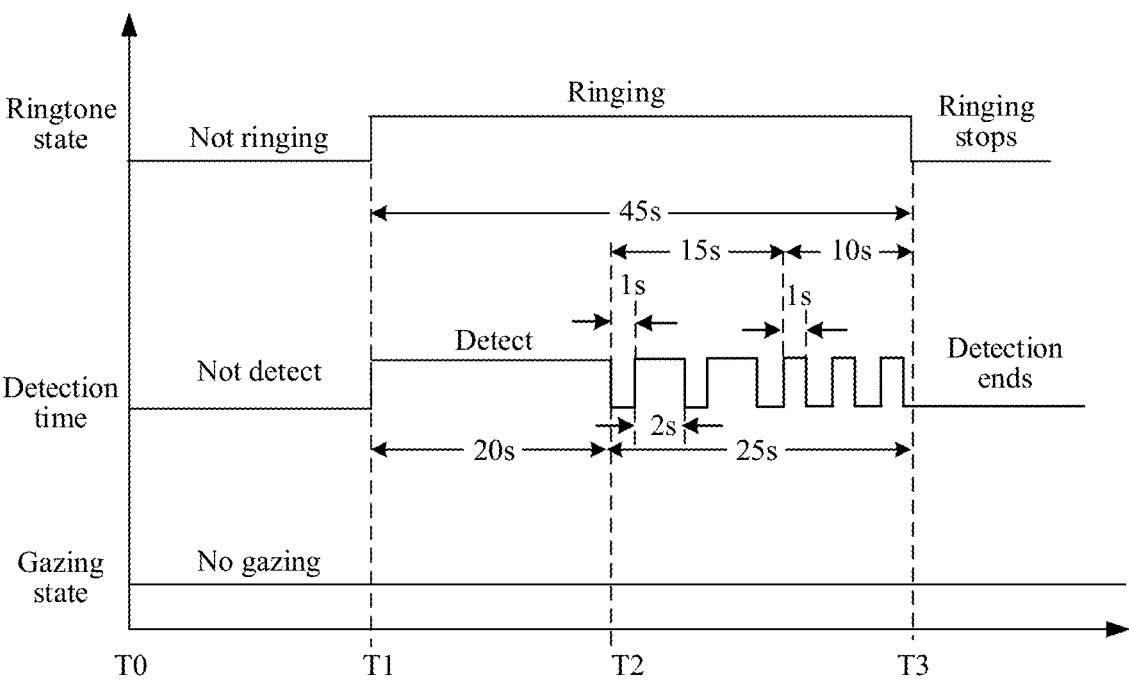

FIG. 14d is an example schematic diagram of ringtone volume reduced upon gazing detection. For example, in this embodiment of this application, the awareness service may further reduce power consumption by shortening the durations of the detection windows in the slow detection cycle. For example, referring to FIG. 14d, in the slow detection cycle (the moments T2 to T3), detection windows opened by the awareness service in the first 15 s of the slow detection cycle each have a duration of 2 s, and intervals between the windows are 1 s. For example, from the 16$^{th}$ second since the start of the slow detection cycle, the awareness service shortens the duration of each detection window. For example, the duration of each detection window is 1 s. The intervals between the detection windows are still 1 s.

Figure 14E:
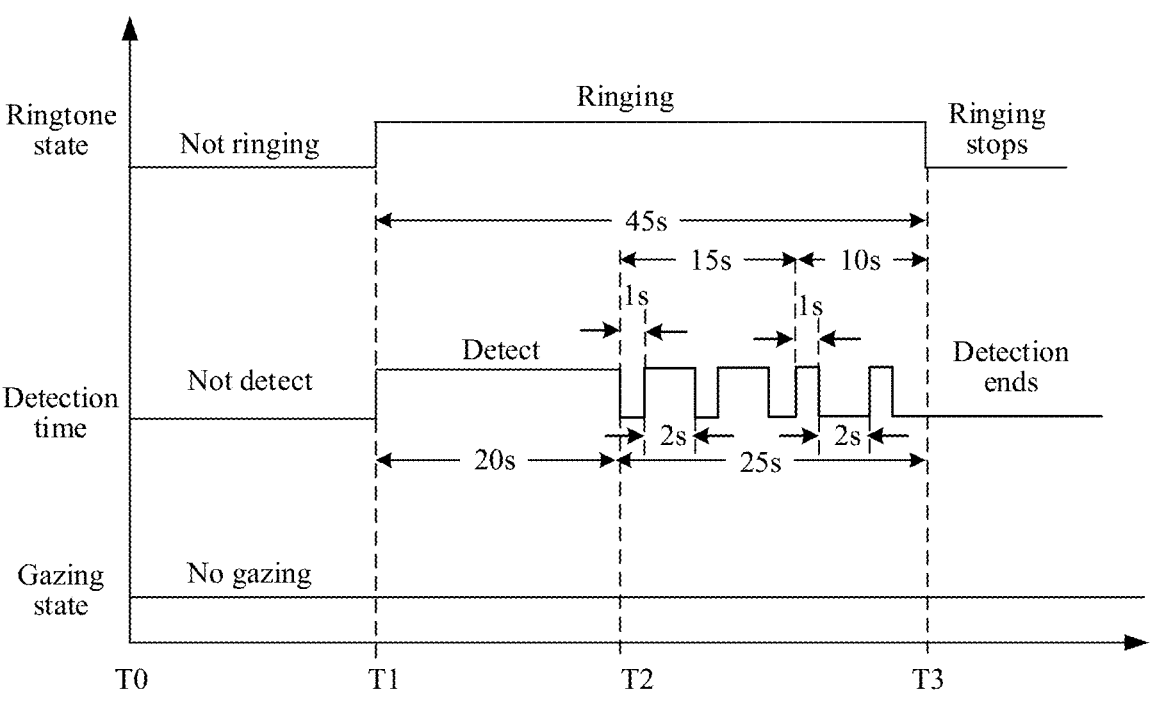

FIG. 14e is an example schematic diagram of ringtone volume reduced upon gazing detection. For example, in this embodiment of this application, the awareness service may further reduce power consumption by shortening the durations of the detection windows in the slow detection cycle and increasing the intervals between the detection windows. For example, referring to FIG. 14e, in the slow detection cycle (the moments T2 to T3), detection windows opened by the awareness service in the first 15 s of the slow detection cycle each have a duration of 2 s, and intervals between the detection windows are Is. From the 16$^{th}$ second since the start of the slow detection cycle, the awareness service shortens the durations of the detection windows to Is, and increases the intervals between the detection windows to 2 s, thereby reducing the system power consumption.

Figure 15:
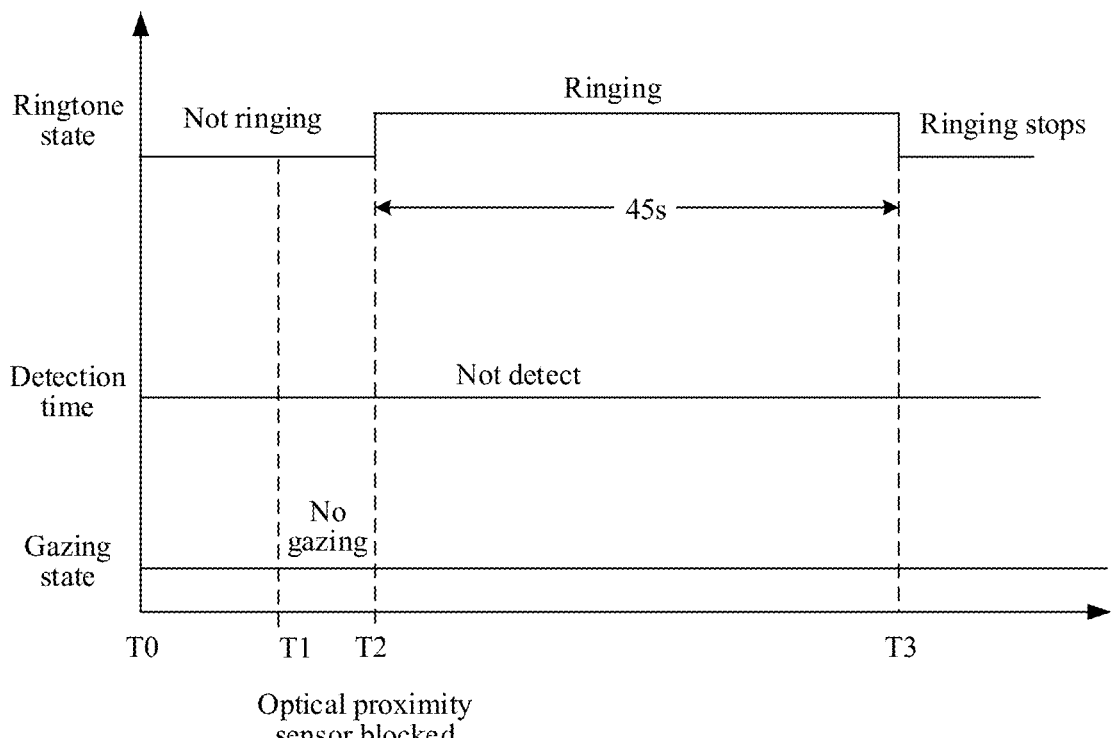
FIG. 15 is an example schematic diagram of ringtone volume reduced upon gazing detection.

FIG. 15 is an example schematic diagram of ringtone volume reduced upon gazing detection. Referring to FIG. 15, for example, at the moments T0 to T1, the awareness service performs the detection process shown in FIG. 8 to FIG. 9. For specific descriptions, refer to the relevant descriptions in FIG. 8 to FIG. 9, which are not repeated herein. For example, at the moment T1, the awareness service detects that the optical proximity sensor is blocked. In an example, the awareness service no longer obtains the incoming call state of the modem, that is, during the period in which the optical proximity sensor is blocked, the awareness service no longer detects the incoming call state. In another example, if the awareness service detects that the optical proximity sensor is blocked, the awareness service may still obtain the incoming call state of the modem. For example, at the moment T2, the awareness service detects an incoming call from a user. However, since the awareness service detects that the optical proximity sensor is still in the blocked state, the awareness service does not open the detection window, that is, does not perform the ringtone volume reduced upon gazing at screen solution.

Figure 16:
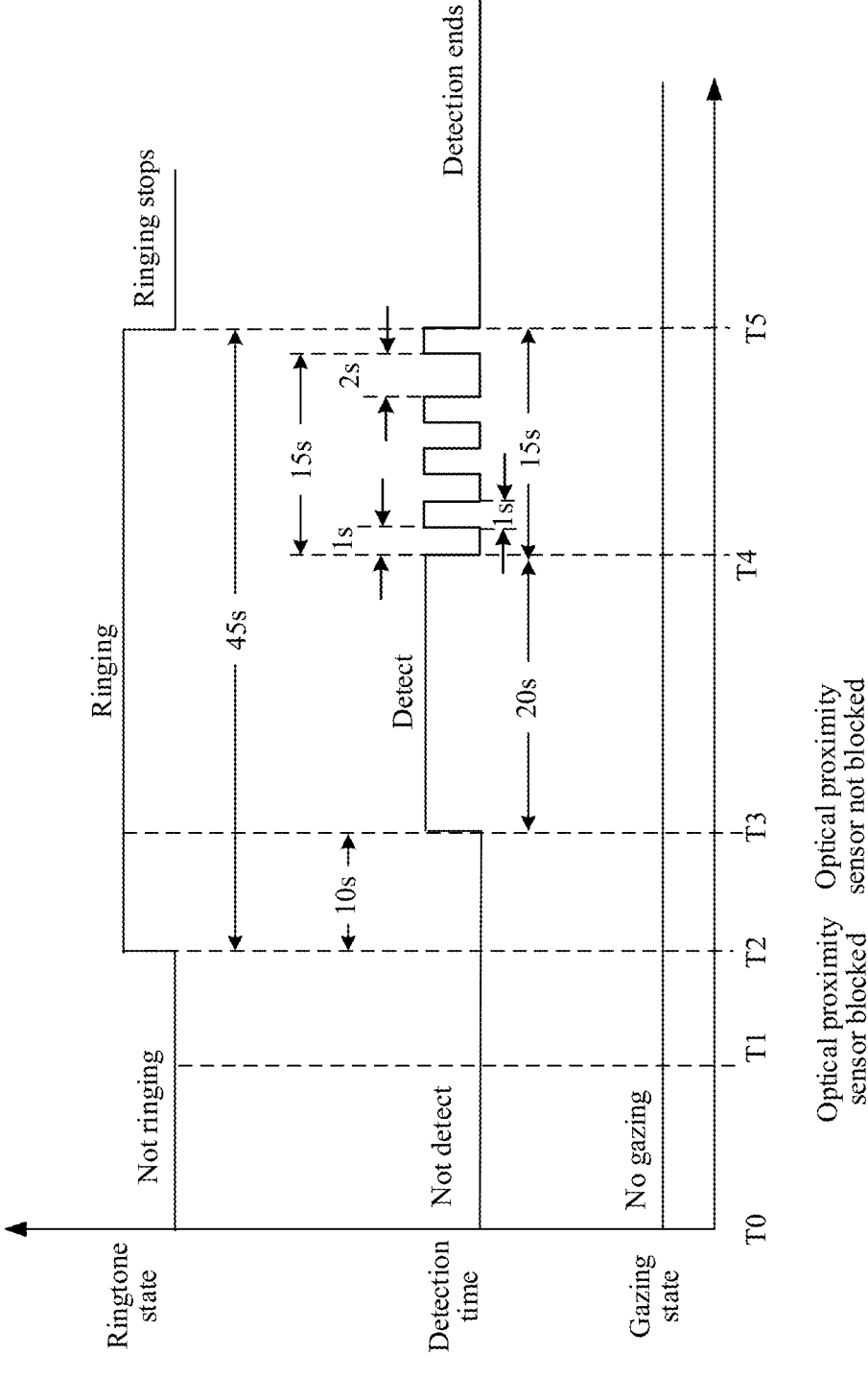
FIG. 16 is an example schematic diagram of ringtone volume reduced upon gazing detection.

FIG. 16 is an example schematic diagram of ringtone volume reduced upon gazing detection. Referring to FIG. 16, for example, at the moments T0 to T1, the awareness service performs the detection process shown in FIG. 8 to FIG. 9. For specific descriptions, refer to the relevant descriptions in FIG. 8 to FIG. 9, which are not repeated herein. For example, at the moment T1, the awareness service detects that the optical proximity sensor is blocked. In an example, the awareness service no longer obtains the incoming call state of the modem, that is, during the period in which the optical proximity sensor is blocked, the awareness service no longer detects the incoming call state. In another example, if the awareness service detects that the optical proximity sensor is blocked, the awareness service may still obtain the incoming call state of the modem. For example, at the moment T2, the awareness service detects an incoming call from a user. However, since the awareness service detects that the optical proximity sensor is still in the blocked state, the awareness service does not open the detection window, that is, does not perform the ringtone volume reduced upon gazing at screen solution. At the moment T3, the awareness service detects that the optical proximity sensor is not blocked, and the awareness service determines that currently an incoming call from a user exists, the mobile phone has enabled the ringing function, and the mobile phone is in the screen on state. Correspondingly, the awareness service determines that the detection condition is satisfied. The awareness service transmits indication information to the ringtone volume reduction application to indicate that the detection condition is satisfied. The ringtone volume reduction application instructs, in response to the indication information of the awareness service, the awareness service to start the ringtone volume reduced upon gazing detection. The awareness service starts the ringtone volume reduced upon gazing detection at the moment T3 in response to the indication of the ringtone volume reduction application. That is to say, the awareness service opens the detection window in the detection cycle. For example, if the awareness service detects the ending of the incoming call at the moment T5 within the 16$^{th}$ second since the start of the slow detection cycle (the slow detection cycle is originally set to 25 seconds), the awareness service stops the detection. For other parts not described, refer to the above, which are not repeated herein.

Figure 17:
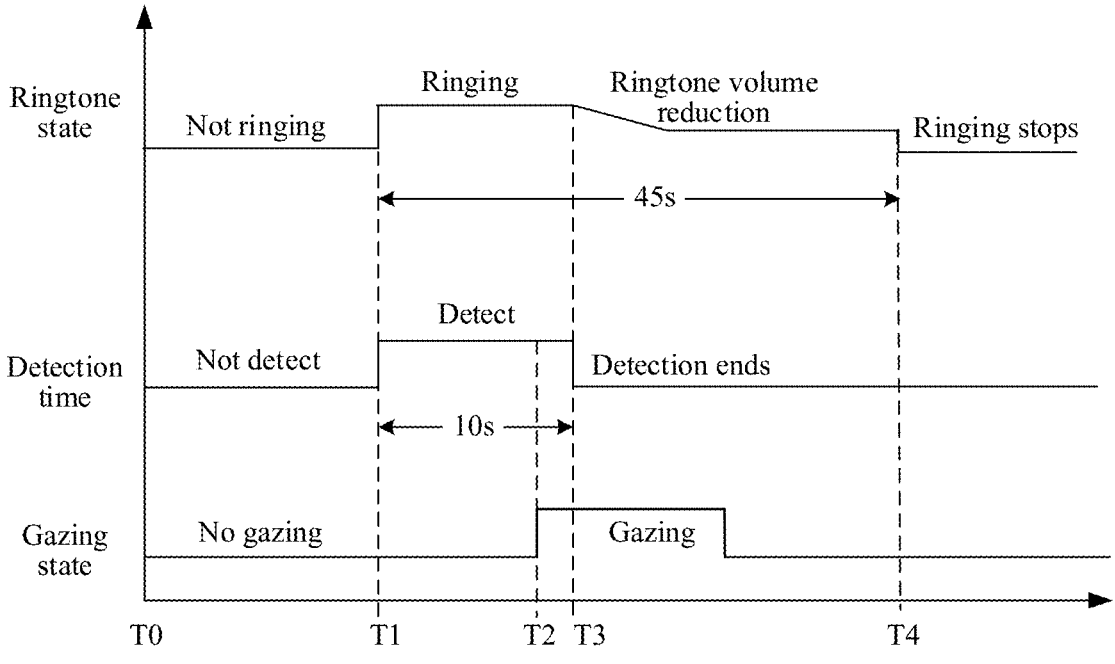
FIG. 17 is an example schematic diagram of ringtone volume reduced upon gazing detection.
Figure 18:
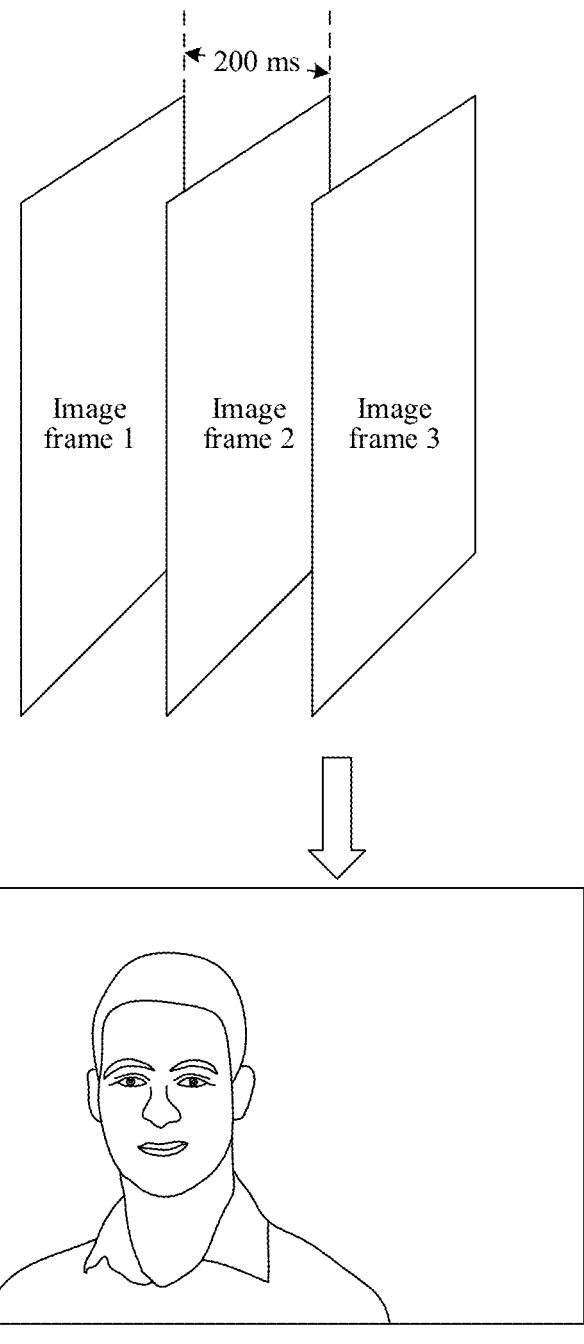
FIG. 18 is an example schematic diagram of human eye recognition.

FIG. 17 is an example schematic diagram of ringtone volume reduced upon gazing detection. Referring to FIG. 17, for example, at the moment T1, the awareness service detects an incoming call and opens the detection window. At the 10$^{th}$ second since opening of the detection window, that is, at the moment T2, the user gazes at the screen. Correspondingly, as shown in FIG. 18, for example, at the moments T2 to T3 (the interval may optionally be is or another value), or at the 10$^{th}$ second since the start of the current detection window, an image frame 3 captured by the camera includes a face image of the user. For example, during the detection of the image frame 3, the AO service determines that the image frame 3 includes a single face, and determines that user gazing exists based on the gazing detection algorithm. The AO service may notify the awareness service that currently the user gazing exists. The awareness service transmits indication information to the ringtone volume reduction application in response to the indication of the AO service, to indicate that the ringtone volume reduced upon gazing condition is satisfied. The ringtone volume reduction application determines, in response to the indication of the awareness service, that ringtone volume reduced upon gazing condition is satisfied. Correspondingly, the ringtone volume reduction application may instruct the awareness service to control the incoming call volume to decrease. For a specific process of interaction between the modules, refer to the relevant descriptions in FIG. 10 and FIG. 13, which is not repeated herein.

Still referring to FIG. 17, for example, at the moment T3, the speaker adjusts the incoming call volume from the first volume to the second volume in response to the indication of the awareness service delivered through the audio drive. The second volume is less than the first volume. Optionally, as described above, the second volume may be 0, or may be greater than 0 and less than the first volume. This is not limited in this application. For example, in this embodiment of this application, the adjustment of the incoming call volume may be gradually adjustment from the first volume to the second volume. For example, a duration of the adjustment may be 2 s. That is to say, in 2 s, the incoming call volume is gradually adjusted to the second volume. Certainly, the duration may alternatively be a larger or smaller value, which is not limited in this application.

For example, at the moment T3, the awareness service ends the current detection process. After the ending of the current incoming call, for example, at the moment T4, S801 is performed again.

Figure 19:
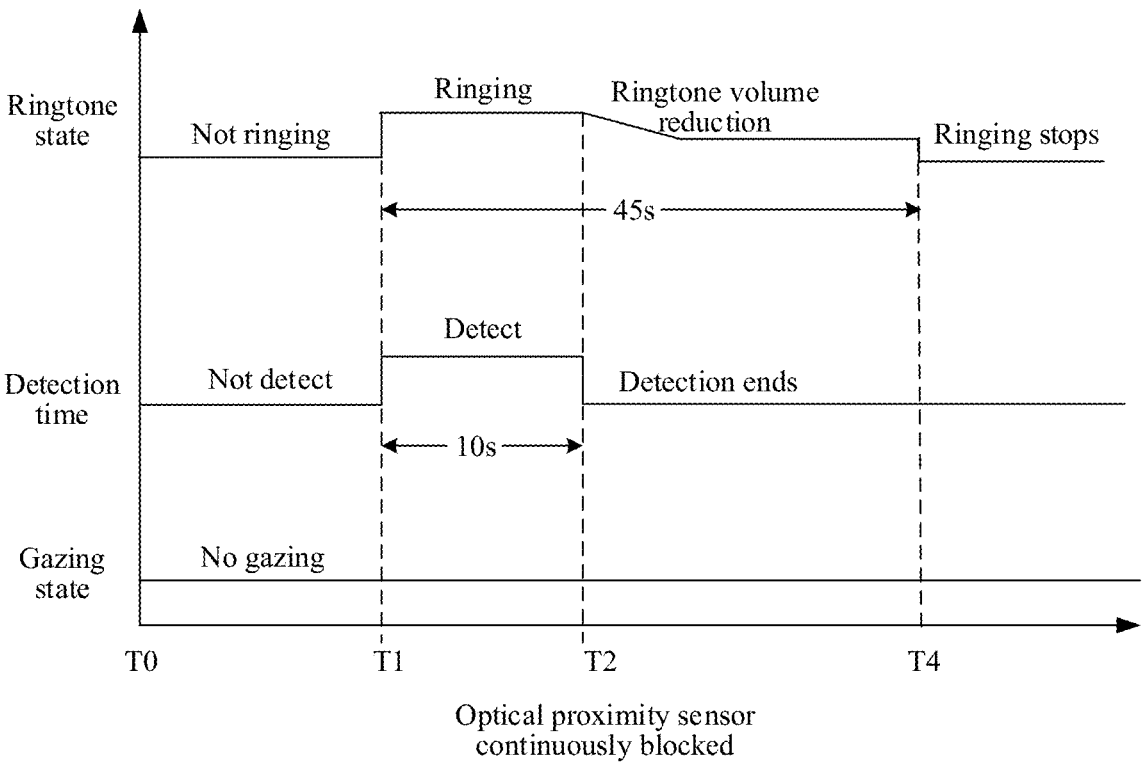
FIG. 19 is an example schematic diagram of ringtone volume reduced upon gazing detection.

FIG. 19 is an example schematic diagram of ringtone volume reduced upon gazing detection. Referring to FIG. 19, for example, at the moment T1, an incoming call from a user is received, and the awareness service starts the detection process. At the moment T2, the user places the mobile phone on a desktop with a front of the mobile phone facing the desktop, that is, the front of the mobile phone faces downward. The awareness service detects that the optical proximity sensor is continuously blocked. Correspondingly, the awareness service reduces the incoming call volume from the first volume to the second volume and ends the detection process. For other parts not described, refer to the above, which are not repeated herein.

Figure 20:
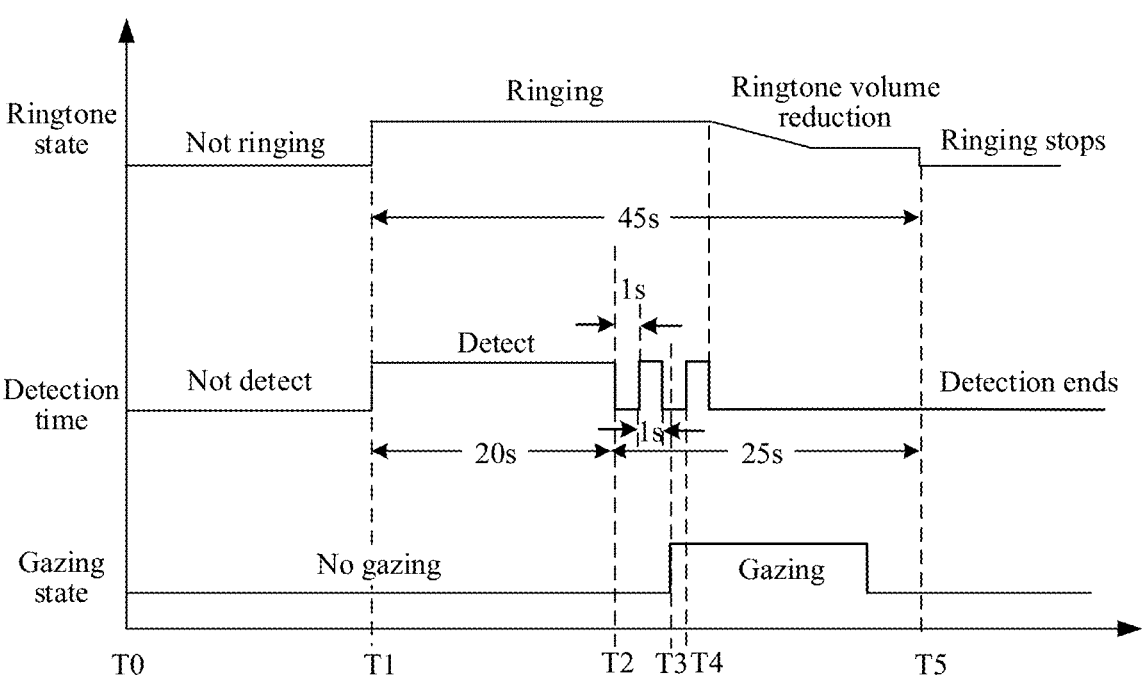
FIG. 20 is an example schematic diagram of ringtone volume reduced upon gazing detection.

FIG. 20 is an example schematic diagram of ringtone volume reduced upon gazing detection. Referring to FIG. 20, for example, at the moment T1, an incoming call from a user is received, and the awareness service starts the detection process. The awareness service does not detect the user gazing in the fast detection cycle, and therefore enters the slow detection cycle. For example, for a distribution of detection windows in the slow detection cycle, refer to any one of FIG. 14a to FIG. 14e. In FIG. 20, the slow detection cycle in FIG. 14a is used as an example. For example, from the moment T2, every Is, the awareness service opens a detection window with a duration of Is. At the moment T3, the user gazes at the screen. At this time, the awareness service is in the interval, that is, does not perform the gazing detection. At the moment T4, the awareness service opens the detection window, that is, performs the ringtone volume reduced upon gazing detection. The awareness service detects that the user is gazing at the screen, and therefore controls the incoming call volume to decrease from the first volume to the second volume, and ends the detection process. For other parts not described, refer to the above, which are not repeated herein. It should be noted that in FIG. 20, that the user gazing is detected only in the slow detection cycle is used as an example for description. In other embodiments, a specific implementation when it is detected the optical proximity sensor is continuously blocked in the slow detection cycle is similar to that in FIG. 20, which is not repeated herein.

Figure 21:
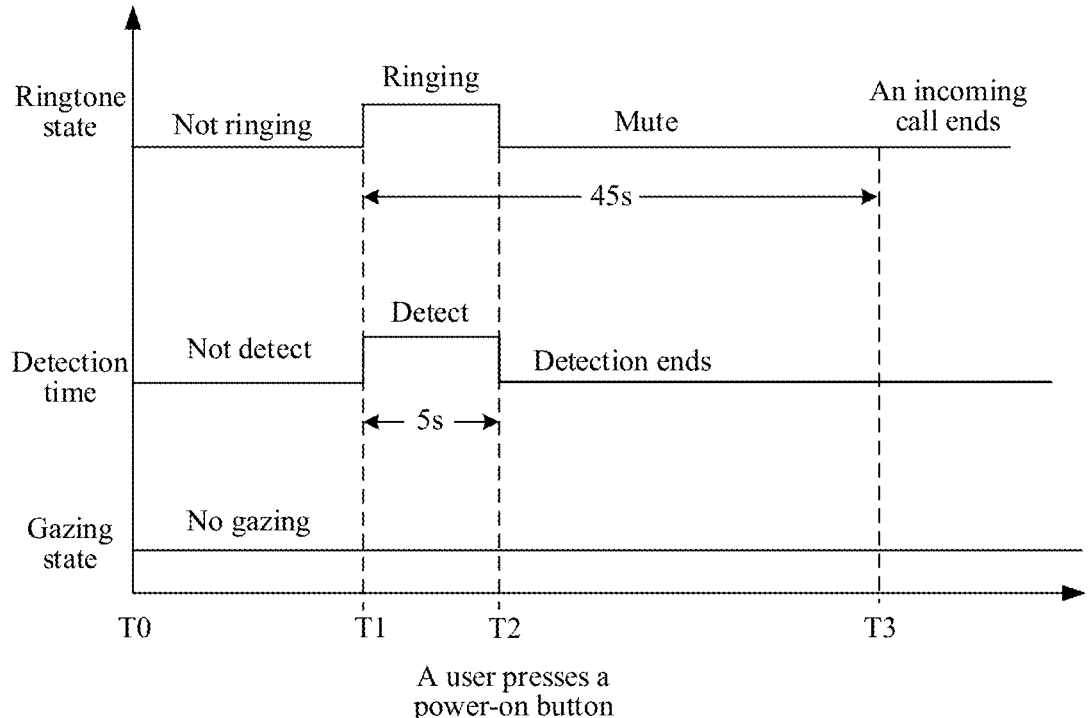
FIG. 21 is an example schematic diagram of ringtone volume reduced upon gazing detection.

FIG. 21 is an example schematic diagram of ringtone volume reduced upon gazing detection. Referring to FIG. 21, for example, at the moment T1, an incoming call from a user is received, and the awareness service starts the detection process. In the fast detection cycle, for example, at the $5^{th}$ second since the opening of the detection window, the awareness service detects that the user presses the power-on button. The awareness service ends the current detection process, and the awareness module may control the speaker to mute. At the moment T3, the incoming call ends, and the awareness service re-performs S801.

In a possible implementation, as described above, the electronic device in this embodiment of this application is not limited to the mobile phone, and may be devices such as a television, a smart home device, or a watch. For example, the electronic device is a television, and an incoming call from the user is received when the television is playing a video at the first volume. For example, the television and the mobile phone of the user may have a same user account and connected to a same wireless network. After the mobile phone receives an incoming call, the mobile phone may transmit an incoming call indicator to the television to indicate that currently an incoming call is received from a user. Correspondingly, after detecting that the mobile phone receives the incoming call, the television may start the volume reduced upon gazing detection. A manner of the detection is the same as that in the above, which is not repeated herein. For example, if the television detects the user gazing, the television may reduce the first volume to the second volume, which eliminates a need for the user to look for a remote control to reduce the volume of the television, thereby improving user experience.

It may be understood that, to implement the foregoing functions, the electronic device includes corresponding hardware structures and/or software modules for performing the functions. Algorithm and steps in the examples described with reference to the embodiments disclosed herein may be implemented by hardware or a combination of hardware and computer software in this application. Whether a function is performed by hardware or computer software driving hardware depends on particular applications and design constraints of the technical solutions. A person of skill in the art may use different methods to implement the described functions with reference to embodiments for each particular application, but it should not be considered that the implementation goes beyond the scope of this application.

Figure 22:
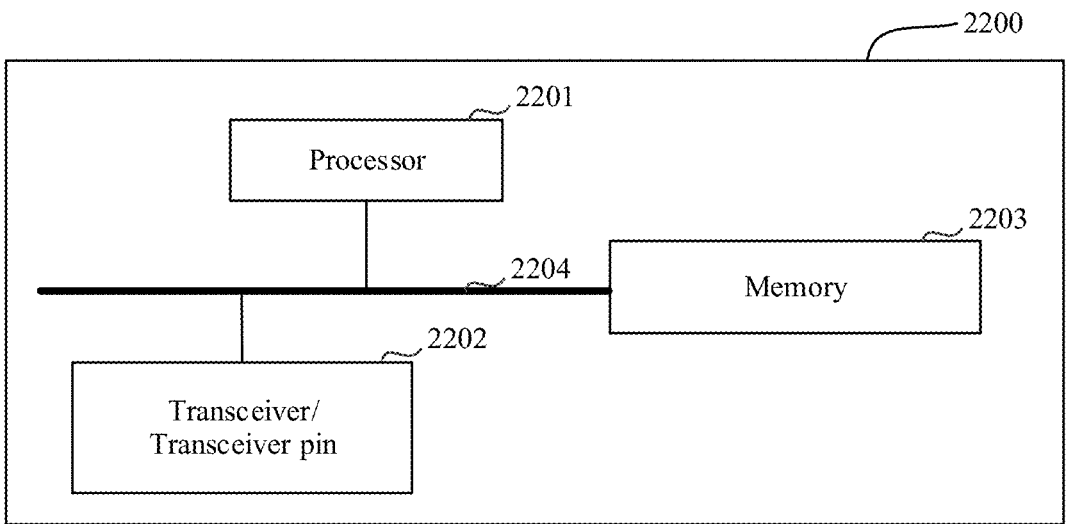
FIG. 22 is an example schematic diagram of an apparatus.

In an example, FIG. 22 is a schematic block diagram of an apparatus 2200 according to an embodiment of this application. The apparatus 2200 may include a processor 2201 and a transceiver/transceiver pin 2202, and optionally further include a memory 2203.

Components of the apparatus 2200 are coupled together by using a bus 2204. In addition to a data bus, the bus system 2204 may further include a power bus, a control bus, a status signal bus, and the like. However, for clear description, various buses in the figure are all referred to as the bus 2204.

Optionally, the memory 2203 may be configured to store the instructions in the foregoing method embodiments. The processor 2201 may be configured to execute the instructions in the memory 2203 and control a receive pin to receive a signal and a transmit pin to transmit a signal.

The apparatus 2200 may be the electronic device or a chip of the electronic device in the foregoing method embodiments.

All related content of the steps in the foregoing method embodiments may be cited as functional description of the corresponding functional modules. Details are not described herein again.

An embodiment further provides a computer storage medium. The computer storage medium stores computer instructions. When the computer instructions are run on an electronic device, the electronic device is caused to perform the steps of the foregoing relevant methods to implement the methods in the foregoing embodiments.

An embodiment further provides a computer program product. When the computer program product is run on a computer, the computer is caused to perform the foregoing relevant steps, to implement the methods in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the methods in the foregoing method embodiments.

The electronic device, the computer storage medium, the computer program product, or the chip provided in embodiments of this application is configured to perform the corresponding methods provided above. Therefore, for beneficial effects that can be achieved, refer to the beneficial effects of the corresponding methods provided above. Details are not described herein.

It may be learned by a person skilled in the art from the foregoing descriptions of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above.

In the plurality of embodiments provided in this application, it should be understood that the disclosed apparatus and method may be implemented in another manner. For example, the described apparatus embodiment is merely an example. For example, the module or unit division is merely logical function division and may be another division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated. A part displayed as a unit may be one physical unit or a plurality of physical units, located at the one position, or may be distributed to different positions. Some or all of the units may be selected according to actual needs to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

Both any content of embodiments of this application and any content of a same embodiment may be freely combined. Any combination of the foregoing content falls into the scope of this application.

When the integrated unit is implemented in the form of a software function unit and is sold or used as an independent product, the integrated unit may be stored in a readable storage medium. Based on such an understanding, the technical solutions in the embodiments of this application essentially, or the part contributing to the prior art, or all or a part of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

Although embodiments of this application are described above with reference to the accompanying drawings, this application is not limited to the specific embodiments described above. The foregoing specific embodiments are illustrative but not restrictive. With the enlightenment of this application, a person of ordinary skill in the art may make many forms without departing from the concept of this application and the protection scope of the claims. These forms fall into the protection of this application.

Steps of the methods or algorithms described in combination with the content disclosed in embodiments of this application may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read only memory (CD-ROM), or a storage medium in any other forms well-known in the art. An example medium is coupled to a processor, so that the processor can read information from the storage medium or write information into the storage medium. Certainly, the storage medium may be a component of the processor. The processor and the storage medium may be located in an ASIC.

A person skilled in the art should be aware that in the foregoing one or more examples, functions described in embodiments of this application may be implemented by hardware, software, firmware, or any combination thereof. When implemented by using software, the functions may be stored in a computer-readable medium or may be used as one or more instructions or codes in a computer-readable medium for transmission. The computer-readable medium includes a computer storage medium and a communication medium. The communication medium includes any medium that facilitates transmission of a computer program from one place to another. The storage medium may be any available medium accessible to a general-purpose or dedicated computer.

Although embodiments of this application are described above with reference to the accompanying drawings, this application is not limited to the specific embodiments described above. The foregoing specific embodiments are illustrative but not restrictive. With the enlightenment of this application, a person of ordinary skill in the art may make many forms without departing from the concept of this application and the protection scope of the claims. These forms fall into the protection of this application.

What is claimed is:

1. An electronic device, comprising:
one or more processors, a memory, and a fingerprint sensor; and
one or more computer programs, wherein the one or more computer programs are stored in the memory, and when the computer programs are executed by the one or more processors, the electronic device is caused to perform the following steps:
receiving first incoming call information when the electronic device is in a screen off state;
in response to the received first incoming call information, switching, by the electronic device, the screen off state to a screen on state, and playing an incoming call ringtone, wherein the incoming call ringtone is at a first volume;
starting a first detection when it is detected that an optical proximity sensor of the electronic device satisfies a first preset condition, wherein a duration of the first detection is a first duration;
detecting biological feature information during the first detection;
ending the first detection, and starting a second detection, wherein a time difference between an end moment of the first detection and a start moment of the second detection is a second duration; and
adjusting the first volume of the incoming call ringtone to a second volume when first target biological feature information is detected at a first moment during the second detection, wherein the second volume is less than the first volume.

2. The electronic device according to claim 1, wherein when the computer programs are executed by the one or more processors, the electronic device is caused to perform the following step:
ending the second detection when first target biological feature information is detected.

3. The electronic device according to claim 1, wherein when the computer programs are executed by the one or more processors, the electronic device is caused to perform the following steps:
receiving second incoming call information when the electronic device is in the screen on state;
playing the incoming call ringtone in response to the received second incoming call information, wherein the incoming call ringtone is at the first volume;

starting a third detection when it is detected that the optical proximity sensor of the electronic device satisfies the first preset condition, wherein a duration of the third detection is the first duration;
detecting biological feature information during the third detection;
ending the third detection, and starting a fourth detection, wherein a time difference between an end moment of the third detection and a start moment of the fourth detection is a third duration, and a duration of the fourth detection is a fourth duration;
detecting biological feature information during the fourth detection;
ending the fourth detection, and starting a fifth detection, wherein a time difference between an end moment of the fourth detection and a start moment of the fifth detection is a fifth duration; and
adjusting the first volume of the incoming call ringtone to the second volume when second target biological feature information is detected at a second moment during the fifth detection;
wherein the third duration is different from the second duration, the fourth duration is less than the first duration, the fifth duration is greater than the third duration, and a duration of the fifth detection is a sixth duration, and the sixth duration is less than the fourth duration.

4. The electronic device according to claim 3, wherein when the computer programs are executed by the one or more processors, the electronic device is caused to perform the following step:
ending the fifth detection when the second target biological feature information is detected.

5. The electronic device according to claim 1, wherein when the computer programs are executed by the one or more processors, the electronic device is caused to perform the following steps:
receiving third incoming call information when the electronic device is in the screen on state;
playing the incoming call ringtone in response to the received third incoming call information, wherein the incoming call ringtone is at the first volume;
starting a sixth detection when it is detected that the optical proximity sensor of the electronic device satisfies the first preset condition, wherein a duration of the sixth detection is the first duration;
detecting biological feature information during the sixth detection;
ending the sixth detection, and starting a seventh detection, wherein a time difference between an end moment of the sixth detection and a start moment of the seventh detection is a sixth duration, and a duration of the seventh detection is a seventh duration;
detecting biological feature information during the seventh detection;
starting an eighth detection when the seventh detection ends, wherein a time difference between an end moment of the seventh detection and a start moment of the eighth detection is an eighth duration, and a duration of the eighth detection is a ninth duration;
ending the eighth detection, and starting a ninth detection, wherein a duration of the ninth detection is the first duration;
detecting biological feature information during the ninth detection; and adjusting the first volume of the incoming call ringtone to the second volume when third target biological feature information is detected at a third moment during the ninth detection.

6. The electronic device according to claim 1, wherein when the computer programs are executed by the one or more processors, the electronic device is caused to perform the following steps:

receiving fourth incoming call information when the electronic device is in the screen on state;

playing the incoming call ringtone in response to the received fourth incoming call information, wherein the incoming call ringtone is at the first volume;

starting a tenth detection when it is detected that the optical proximity sensor of the electronic device satisfies the first preset condition, wherein a duration of the tenth detection is the first duration; and adjusting the first volume of the incoming call ringtone to the second volume at a fourth moment during the tenth detection when it is detected that the optical proximity sensor satisfies a second preset condition.

7. The electronic device according to claim 6, wherein the third preset condition comprises:

an incoming call is hung up, the incoming call is answered, or the incoming call ends.

8. The electronic device according to claim 1, wherein when the computer programs are executed by the one or more processors, the electronic device is caused to perform the following steps:

receiving fifth incoming call information when the electronic device is in the screen on state;

playing the incoming call ringtone in response to the received fifth incoming call information, wherein the incoming call ringtone is at the first volume;

starting an eleventh detection when it is detected that the optical proximity sensor of the electronic device satisfies the first preset condition, wherein a duration of the eleventh detection is the first duration; and stopping playing the incoming call ringtone during the eleventh detection when it is detected that the incoming call information satisfies a third preset condition.

9. The electronic device according to claim 1, wherein the first target biological feature information is human eye feature information.

10. An incoming call volume control method, comprising:

receiving first incoming call information when an electronic device is in a screen off state;

in response to the received first incoming call information, switching, by the electronic device, the screen off state to a screen on state, and playing an incoming call ringtone, wherein the incoming call ringtone is at a first volume;

starting a first detection when it is detected that an optical proximity sensor of the electronic device satisfies a first preset condition, wherein a duration of the first detection is a first duration;

detecting biological feature information during the first detection;

ending the first detection, and starting a second detection, wherein a time difference between an end moment of the first detection and a start moment of the second detection is a second duration; and adjusting the first volume of the incoming call ringtone to a second volume when first target biological feature information is detected at a first moment during the second detection, wherein the second volume is less than the first volume.

11. The method according to claim 10, further comprising:

ending the second detection when first target biological feature information is detected.

12. The method according to claim 10, further comprising:

receiving second incoming call information when the electronic device is in the screen on state;

playing the incoming call ringtone in response to the received second incoming call information, wherein the incoming call ringtone is at the first volume;

starting a third detection when it is detected that the optical proximity sensor of the electronic device satisfies the first preset condition, wherein a duration of the third detection is the first duration;

detecting biological feature information during the third detection;

ending the third detection, and starting a fourth detection, wherein a time difference between an end moment of the third detection and a start moment of the fourth detection is a third duration, and a duration of the fourth detection is a fourth duration;

detecting biological feature information during the fourth detection;

ending the fourth detection, and starting a fifth detection, wherein a time difference between an end moment of the fourth detection and a start moment of the fifth detection is a fifth duration; and adjusting the first volume of the incoming call ringtone to the second volume when second target biological feature information is detected at a second moment during the fifth detection;

wherein the third duration is different from the second duration, the fourth duration is less than the first duration, the fifth duration is greater than the third duration, and a duration of the fifth detection is a sixth duration, and the sixth duration is less than the fourth duration.

13. The method according to claim 12, comprising:

ending the fifth detection when the second target biological feature information is detected.

14. The method according to claim 10, comprising:

receiving third incoming call information when the electronic device is in the screen on state;

playing the incoming call ringtone in response to the received third incoming call information, wherein the incoming call ringtone is at the first volume;

starting a sixth detection when it is detected that the optical proximity sensor of the electronic device satisfies the first preset condition, wherein a duration of the sixth detection is the first duration;

detecting biological feature information during the sixth detection;

ending the sixth detection, and starting a seventh detection, wherein a time difference between an end moment of the sixth detection and a start moment of the seventh detection is a sixth duration, and a duration of the seventh detection is a seventh duration;

detecting biological feature information during the seventh detection;

starting an eighth detection when the seventh detection ends, wherein a time difference between an end moment of the seventh detection and a start moment of the eighth detection is an eighth duration, and a duration of the eighth detection is a ninth duration;

ending the eighth detection, and starting a ninth detection, wherein a duration of the ninth detection is the first duration;

detecting biological feature information during the ninth detection; and adjusting the first volume of the incoming call ringtone to the second volume when third target biological feature information is detected at a third moment during the ninth detection.

15. The method according to claim 10, comprising:

receiving fourth incoming call information when the electronic device is in the screen on state;

playing the incoming call ringtone in response to the received fourth incoming call information, wherein the incoming call ringtone is at the first volume;

starting a tenth detection when it is detected that the optical proximity sensor of the electronic device satisfies the first preset condition, wherein a duration of the tenth detection is the first duration; and adjusting the first volume of the incoming call ringtone to the second volume at a fourth moment during the tenth detection when it is detected that the optical proximity sensor satisfies a second preset condition.

16. The method according to claim 10, further comprising:

receiving fifth incoming call information when the electronic device is in the screen on state;

playing the incoming call ringtone in response to the received fifth incoming call information, wherein the incoming call ringtone is at the first volume;

starting an eleventh detection when it is detected that the optical proximity sensor of the electronic device satisfies the first preset condition, wherein a duration of the eleventh detection is the first duration; and stopping playing the incoming call ringtone during the eleventh detection when it is detected that the incoming call information satisfies a third preset condition.

17. The method according to claim 16, wherein the third preset condition comprises:

an incoming call is hung up, the incoming call is answered, or the incoming call ends.

18. The method according to claim 10, wherein the first target biological feature information is human eye feature information.

19. A non-transitory computer-readable storage medium, comprising a computer program, wherein when the computer program is run on an electronic device, the electronic device is caused to perform:

receiving first incoming call information when an electronic device is in a screen off state;

in response to the received first incoming call information, switching, by the electronic device, the screen off state to a screen on state, and playing an incoming call ringtone, wherein the incoming call ringtone is at a first volume;

starting a first detection when it is detected that an optical proximity sensor of the electronic device satisfies a first preset condition, wherein a duration of the first detection is a first duration;

detecting biological feature information during the first detection;

ending the first detection, and starting a second detection, wherein a time difference between an end moment of the first detection and a start moment of the second detection is a second duration; and adjusting the first volume of the incoming call ringtone to a second volume when first target biological feature information is detected at a first moment during the second detection, wherein the second volume is less than the first volume.

\* \* \* \* \*